(12) United States Patent
Edwards

(10) Patent No.: US 9,714,361 B2
(45) Date of Patent: Jul. 25, 2017

(54) OXIRANE (ETHYLENE OXIDE) POLYURETHANE COATINGS

(71) Applicant: Lake Region Manufacturing, Inc., Chaska, MN (US)

(72) Inventor: Peter Anthony Edwards, Cokato, MN (US)

(73) Assignee: Lake Region Manfacturing, Inc., Chaska, MN (US)

( * ) Notice: Subject to any disclaimer, the term of this patent is extended or adjusted under 35 U.S.C. 154(b) by 0 days.

(21) Appl. No.: 15/224,952

(22) Filed: Aug. 1, 2016

(65) Prior Publication Data

US 2016/0340545 A1    Nov. 24, 2016

Related U.S. Application Data

(63) Continuation-in-part of application No. 15/015,648, filed on Feb. 4, 2016, which is a continuation of application No. 13/834,988, filed on Mar. 15, 2013, now Pat. No. 9,255,173.

(51) Int. Cl.

| | |
|---|---|
| *C08G 18/40* | (2006.01) |
| *C08G 18/58* | (2006.01) |
| *C08G 18/76* | (2006.01) |
| *C08G 18/78* | (2006.01) |
| *C08G 59/22* | (2006.01) |
| *C08G 59/28* | (2006.01) |
| *C08G 59/32* | (2006.01) |
| *C08G 18/00* | (2006.01) |
| *C08G 18/08* | (2006.01) |
| *C08G 18/10* | (2006.01) |
| *C08G 18/28* | (2006.01) |
| *C08G 18/42* | (2006.01) |
| *C08G 18/48* | (2006.01) |
| *C08G 18/66* | (2006.01) |
| *C08G 18/73* | (2006.01) |
| *C08G 59/00* | (2006.01) |
| *C08G 59/26* | (2006.01) |
| *C08G 59/42* | (2006.01) |
| *C08G 59/62* | (2006.01) |
| *C08G 65/26* | (2006.01) |
| *C08G 65/32* | (2006.01) |
| *C08G 65/332* | (2006.01) |
| *C08L 63/00* | (2006.01) |
| *C09D 163/00* | (2006.01) |
| *C09D 175/08* | (2006.01) |
| *C09D 171/02* | (2006.01) |
| *C09D 175/04* | (2006.01) |
| *C08G 18/70* | (2006.01) |
| *C08G 18/75* | (2006.01) |
| *C08G 18/24* | (2006.01) |
| *C08G 18/34* | (2006.01) |
| *C08G 18/38* | (2006.01) |
| *A61L 31/10* | (2006.01) |
| *A61L 31/14* | (2006.01) |
| *A61L 29/08* | (2006.01) |

(52) U.S. Cl.
CPC ....... *C09D 171/02* (2013.01); *C08G 18/0823* (2013.01); *C08G 18/0866* (2013.01); *C08G 18/246* (2013.01); *C08G 18/2845* (2013.01); *C08G 18/348* (2013.01); *C08G 18/3834* (2013.01); *C08G 18/4018* (2013.01); *C08G 18/4238* (2013.01); *C08G 18/4808* (2013.01); *C08G 18/4833* (2013.01); *C08G 18/4854* (2013.01); *C08G 18/6692* (2013.01); *C08G 18/706* (2013.01); *C08G 18/73* (2013.01); *C08G 18/75* (2013.01); *C08G 18/76* (2013.01); *C08G 18/7671* (2013.01); *C08G 65/2618* (2013.01); *C09D 175/08* (2013.01); *C08G 2210/00* (2013.01)

(58) Field of Classification Search
CPC ............ C08G 18/2845; C08G 18/0823; C08G 18/4018; C08G 18/4238; C08G 18/4244; C08G 18/4247; C08G 18/4808; C08G 18/4854; C08G 18/6692; C08G 18/7671; C08G 18/4833; C08G 18/706; C08G 18/76; C08G 18/348; C08G 18/3834; C08L 63/00–63/10; C08L 75/04; C08L 75/06; C08L 75/08; C09D 163/00–163/10; C09D 175/04; C09D 175/06; C09D 175/08; C09D 171/02; C09J 163/00–163/10
See application file for complete search history.

(56) References Cited

U.S. PATENT DOCUMENTS

| | | |
|---|---|---|
| 3,761,452 A | 9/1973 | Dawson |
| 4,069,208 A | 1/1978 | Hoeschele |
| 4,119,094 A | 10/1978 | Micklus et al. |
| 4,495,229 A | 1/1985 | Wolf et al. |
| 4,638,017 A | 1/1987 | Larson et al. |
| 4,713,448 A | 12/1987 | Balazs et al. |
| 4,990,357 A | 2/1991 | Karakelle et al. |

(Continued)

FOREIGN PATENT DOCUMENTS

WO    2013158845    10/2013

OTHER PUBLICATIONS

International Search, PCT/US2014/027661, International filing date Mar. 14, 2014 Mailing date Jul. 28, 2014.
European Search Report, Application 14771126.1 dated Oct. 26, 2016.

*Primary Examiner* — Kregg Brooks
(74) *Attorney, Agent, or Firm* — Michael F. Scalise

(57) ABSTRACT

The present invention relates to hydrophilic, i.e., water loving coatings (hereafter referred to as "WLC"). Polyurethane epoxy alkylene oxide coatings usable as coatings on for example, medical devices are a preferred WLC.

30 Claims, No Drawings

(56) References Cited

U.S. PATENT DOCUMENTS

| | | |
|---|---|---|
| 5,041,100 A | 8/1991 | Rowland et al. |
| 5,104,930 A | 4/1992 | Rinde et al. |
| 5,175,229 A | 12/1992 | Kehr et al. |
| 5,480,958 A | 1/1996 | Starner et al. |
| 5,576,072 A | 11/1996 | Hostettler et al. |
| 5,688,855 A | 11/1997 | Stoy et al. |
| 5,749,837 A | 5/1998 | Palermo et al. |
| 5,776,611 A | 7/1998 | Elton et al. |
| 5,912,314 A | 6/1999 | Wolf |
| 5,919,570 A | 7/1999 | Hostettler et al. |
| 6,706,025 B2 | 3/2004 | Engelson et al. |
| 6,849,337 B2 | 2/2005 | Ohrbom et al. |
| 7,193,011 B2 | 3/2007 | Kim et al. |
| 7,226,972 B2 | 6/2007 | Zhao et al. |
| 7,652,166 B2 | 1/2010 | Haubennestel et al. |
| 7,776,956 B2 | 8/2010 | Webster et al. |
| 2003/0027923 A1 | 2/2003 | Lo et al. |
| 2009/0264558 A1 | 10/2009 | Kramer et al. |
| 2009/0288766 A1 | 11/2009 | Kramer et al. |
| 2011/0015724 A1 | 1/2011 | Köcher et al. |
| 2011/0021657 A1 | 1/2011 | Köcher et al. |
| 2011/0021696 A1 | 1/2011 | Köcher et al. |
| 2014/0275341 A1 | 9/2014 | Edwards et al. |

OXIRANE (ETHYLENE OXIDE) POLYURETHANE COATINGS

CROSS-REFERENCE TO RELATED APPLICATIONS

This application is a continuation-in-part of U.S. patent application Ser. No. 15/015,648, filed on Feb. 4, 2016, abandoned, which is a continuation of U.S. patent application Ser. No. 13/834,988, filed on Mar. 15, 2013, now U.S. Pat. No. 9,255,173.

BACKGROUND OF THE INVENTION

Hydrophilic, i.e., water loving coatings (hereafter referred to as "WLC") are a utilitarian chemistry that may be used for hydrophilic and hydrophobic polyurethane epoxies as a replacement of isocyanate-based coatings on, for example, medical devices. WLC chemistry is attractive since prior art isocyanates-based coating compositions and coatings that may be used present possible health concerns. Another concern, with isocyanates, is the isocyanate sensitivity to water which reacts therewith to evolve carbon dioxide. That side reaction produces a very rough coating due to micro roughness when carbon dioxide exits the coating forming small pin holes. However, once the isocyanate is end capped to form polyurethane epoxy (glycidyl carbamate) in accordance with this invention, reactions with water and off gassing are no longer a concern and health concerns are significantly reduced. The use of WLC chemistry, in medical devices, and other coating areas, is thusly very attractive particularly for medical device applications.

SUMMARY OF THE INVENTION

WLC synthesis reactions can be optimized generally by running at lower temperatures which tends to reduce side reactions. Reaction order is also a very important consideration in WLC development. In the case of oxirane polyurethane-based WLC's the methylenebisdiisocyanate (MDI) should be either a liquid or a melted solid before polyol additions and that adipic acid dihydrazide is fully reacted before adding dibutyltin dilaurate catalyst and glycidol. Adding glycidol too early may result in amine reactions with glycidol, and addition of catalyst too early may alter the chain extending network and form a less desirable coating. WLC glycidyl (oxirane functionality) termination has shown an increase in coating adhesive and cohesive strength.

DETAILED DESCRIPTION

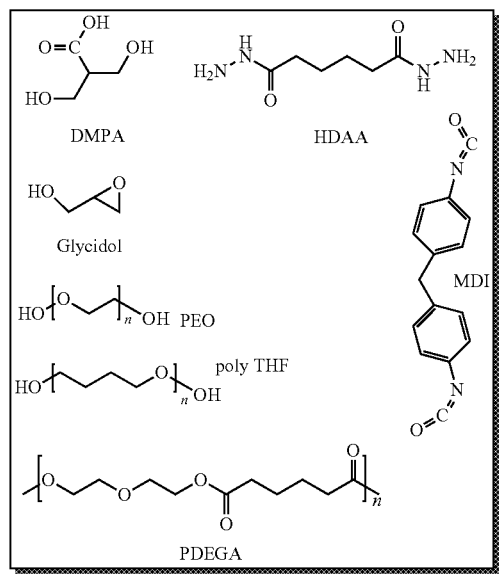

In the above formulae:
"$n_1$", relating to PEO, falls in the range of about 500 to about 45,000 or higher;
"$n_2$", relating to polyTHF, falls in the range of about 3 to about 600 or higher;
"$n_3$", relating to PDEGA, falls in the range of about 2 to about 60,000 or higher, and
"$n_4$" is lower alkylene, $n_4$ falling in the range of 1 to about 4

Note that the $n_4$ alkylene group optionally couples other isocyanate moieties as is noted below.

1. Glycidol, PEO (polyethylene oxide), dimethylol propionic acid (DMPA), polytetrahydrofuran (polyTHF), and poly [di(ethylene glycol)adipate] (PDEGA hydroxyl) can react with methylenebisdiisocyanate for chain extension.
2. Adipic acid dihydrazide (AAD) reacts with isocyanate for chain extension.
3. End group is terminated with glycidol for glycidyl functionality.
4. Reaction kinetics are faster with an aromatic group next to isocyanate.
   The monomers and oligomers (including the genericized polymer constituents) and synthetic route noted about was used to produce coatings/compositions of this invention.

Side reaction free reaction scheme to terminate with epoxy end groups and minimize side reactions.

The terminal oxirane polyurethane chemistry coatings of this invention primary reactions that make up the polyurethane coatings of this invention are listed below:

1. Terminal Oxirane Polyurethane Reactive Coating Compositions are an extremely lubricious durable coating that contains both hard and soft segments. This structure contains polyurethane and epoxy groups. This is a modified aqueous and solvent soluble material to increase physical crosslinks via hydrogen bonding. This structure relies on physical crosslinks for strength through hard segment domains. The hard segments contain aromatic groups, which also stack by pi-bond interactions. "Hard segments" as the term is used herein means substantially crystalline.

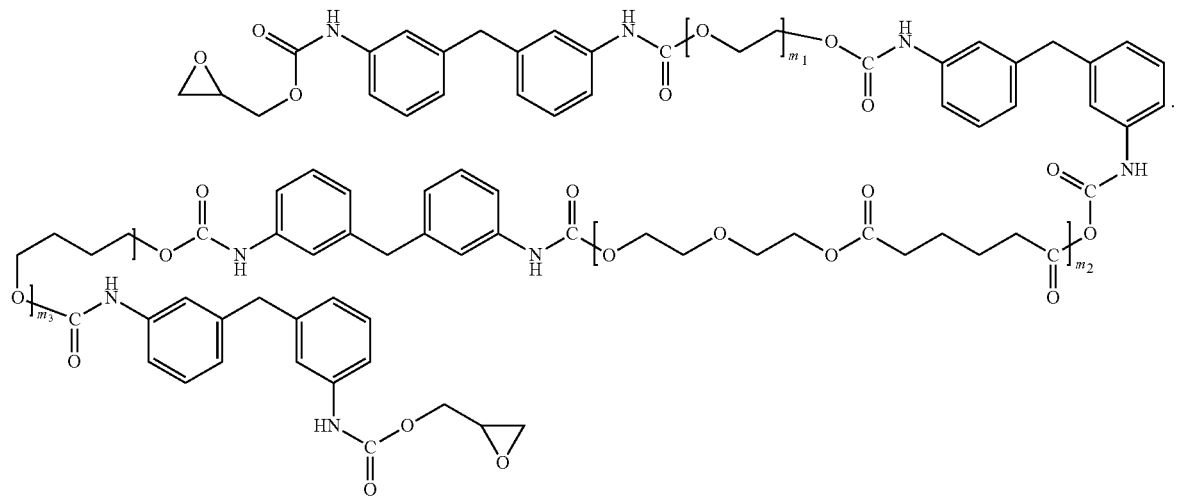

I

2. Terminal a Composition Comprising Epoxy Urethane Ester Carboxylic Acid Alkylene Oxide Reactive Coating Compositions This example describes the preparation of an inventive water-loving coating (WLC) Epoxy urethane ester carboxylic acid alkylene oxide reactive coating compositions. A 500 mL four neck reaction kettle with condenser, nitrogen inlet and model Gemini J-KEM temperature controller, mechanical stirrer, and heating mantel was used for resin synthesis. 16.8 g of methylenebisdiisocyanate (MDI)>99.0% was charged to the reactor. The temperature was held at 40° C. for 40 minutes for solid softening. Next, 62.5 g of Poly[di(ethylene glycol) adipate], average $M_n$ ~2,500, 72.5 g of Poly(tetrahydrofuran), average $M_n$ ~2,900, and 3.35 g of 2,2-Bis(hydroxymethyl)propionic acid 98% was added, in the following order and homogenized by stirring for 5 minutes at 40° C. To this homogenized mixture 150 grams of Poly(ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour, 3.7 grams glycidol were added and the temperature was held overnight until reaction completion.

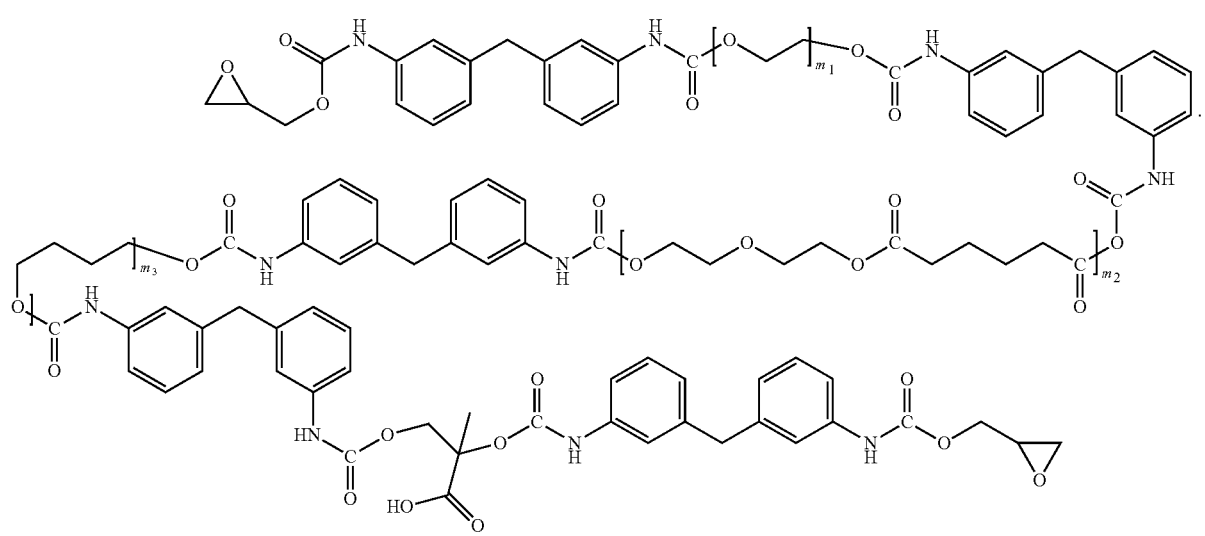

II

3. Terminal Oxirane Polyurethane Urea Chain Extender/ (No Addition of Water).

Reactive Coating Compositions are an extremely lubricious durable coating that contains both hard and soft segments. The structure contains polyurethane, urea and epoxy groups. This is a modified aqueous and solvent soluble material that employs urea formation to increase physical crosslinks via hydrogen bonding. Carboxylic acid functionality in the polymer backbone and glycidol end groups add crosslinking. The epoxy end groups help with adhesion and cohesive strength. This structure relies on crosslinks much like the polyurethane epoxy but contains a chain extender based off adipic acid dihydrazide.

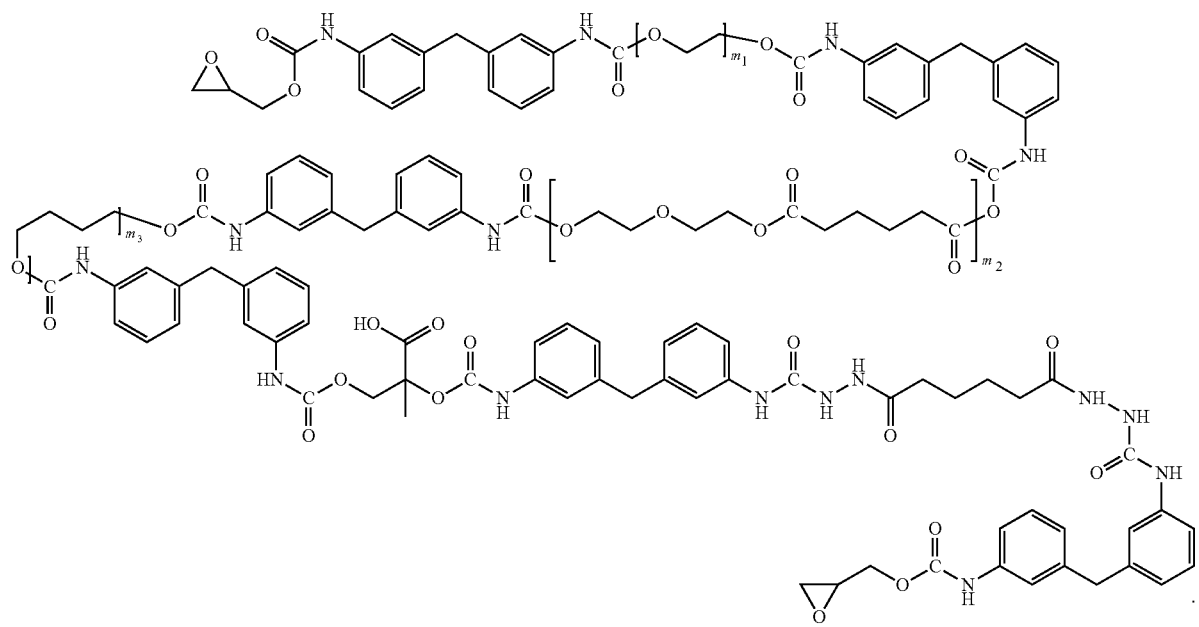

III

4. Terminal Oxirane Polyurethane Urea Chain Extender/ (Water Excess).

Reactive Coating Compositions are an extremely lubricious durable coating that contains both hard and soft segments i.e., crystalline and amorphous segments. This structure contains polyurethane, urea and epoxy groups. This is a modified aqueous and solvent soluble material employs urea formation to increase physical crosslinks via hydrogen bonding. Carboxylic acid functionality in the polymer backbone and glycidol end groups add crosslinking, the reaction of isocyanate forms an unstable carbamic acid that forms an amine. The amine quickly reacts with isocyanate functionality to form a urea.

Water functionality reacts with excess MDI isocyanate to release $CO_2$ and form an amine. The amine functionality reacts with excess isocyanate to form additional urea linkages. The water/amine reaction is highly, physically crosslink the system and enhance its mechanical properties. The active hydrogen of the secondary amine can further react with excess isocyanate to slightly crosslink the system. The combination of urea, and polyurethane hard segments and glycidol functionalities lead to a superior crosslinking system.

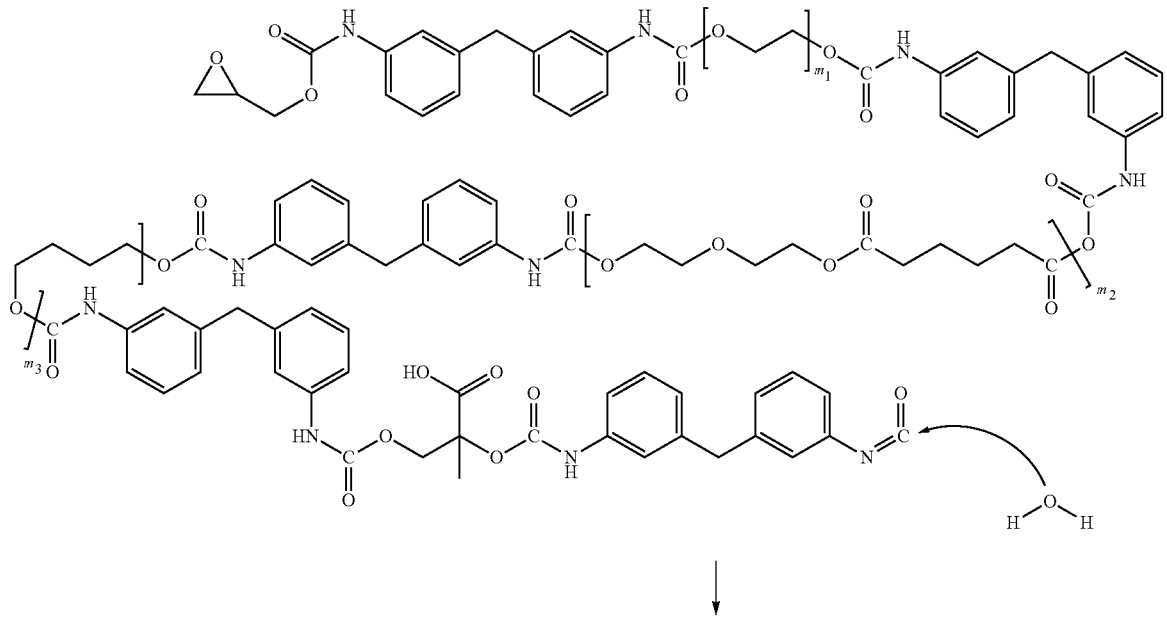

IV

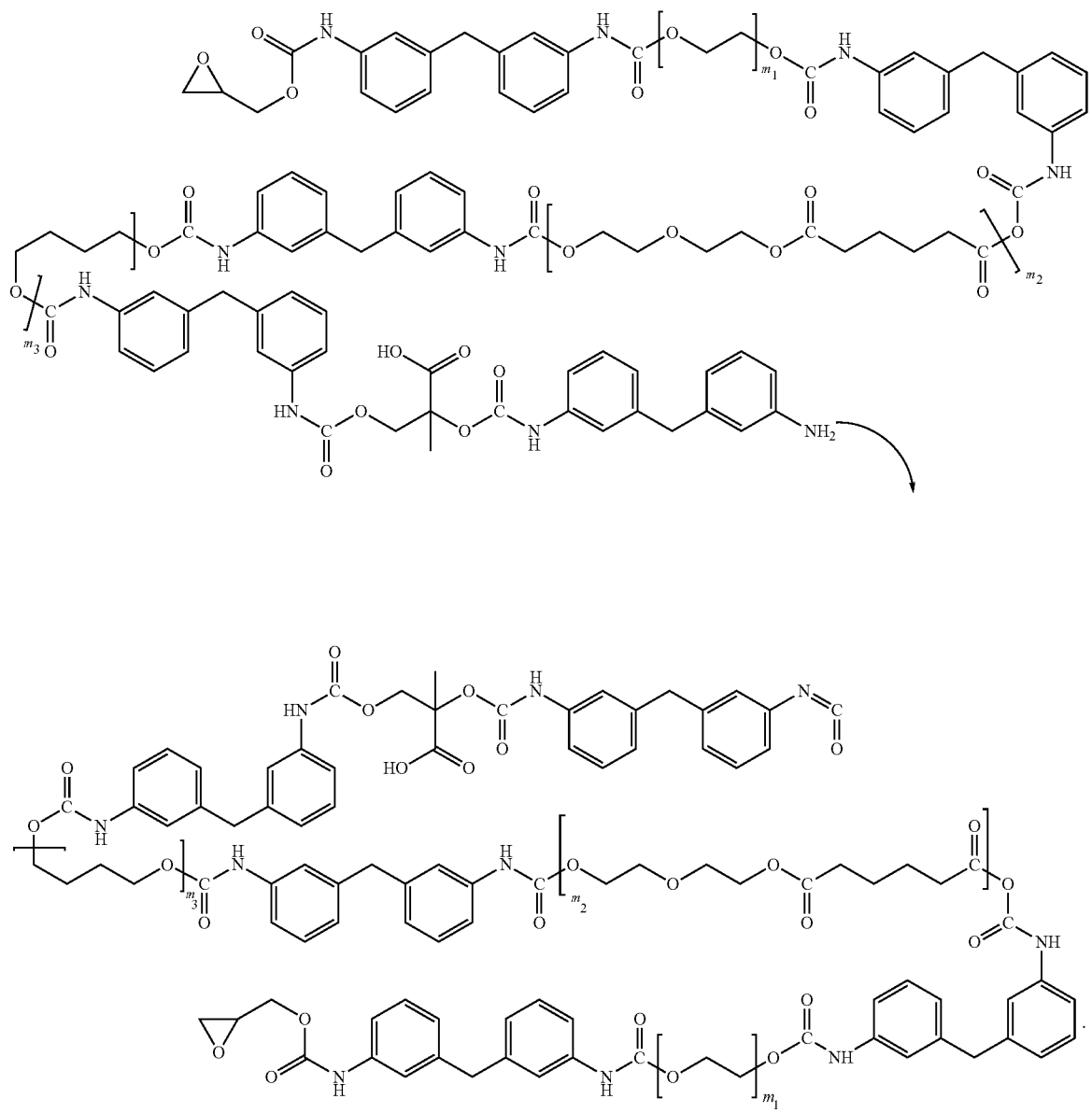

Water Reactions with Isocyanate to Form Urea

5. Terminal Oxirane Polyurethane Amide/Amide Urea/ (No Addition of Water).

Reactive Coating Compositions are an extremely lubricious durable coating that contains both hard and soft segments. This is structure contains polyurethane, urea, amide (amide to form urea) and epoxy groups. This is a modified aqueous and solvent soluble material employs amide formation that may undergo additional reactions to form urea. Urea and hard segments yield an increase in hydrogen bonding for physical crosslinks, carboxylic acid functionality in the polymer backbone and glycidol end groups add crosslinking. Amide functionality can continue to react with isocyanate to form urea. This crosslinking system helps increase durability of the basecoat.

Isocyanate Reaction with Amide to Form Crosslinked Urea

For example, DMPA was used to construct the polymer backbone for the introducing carboxylic acid functionality. This functionality reacts with excess MDI isocyanate around 80 C to form an amide bond. The amide reaction is to slightly cross-link the system and increase its mechanical properties. The active hydrogen of the amide functionally can further react with excess isocyanate to form urea. The combination of amide, urea, and polyurethane hard segments and glycidol functionalities lead to a superior crosslinking system.

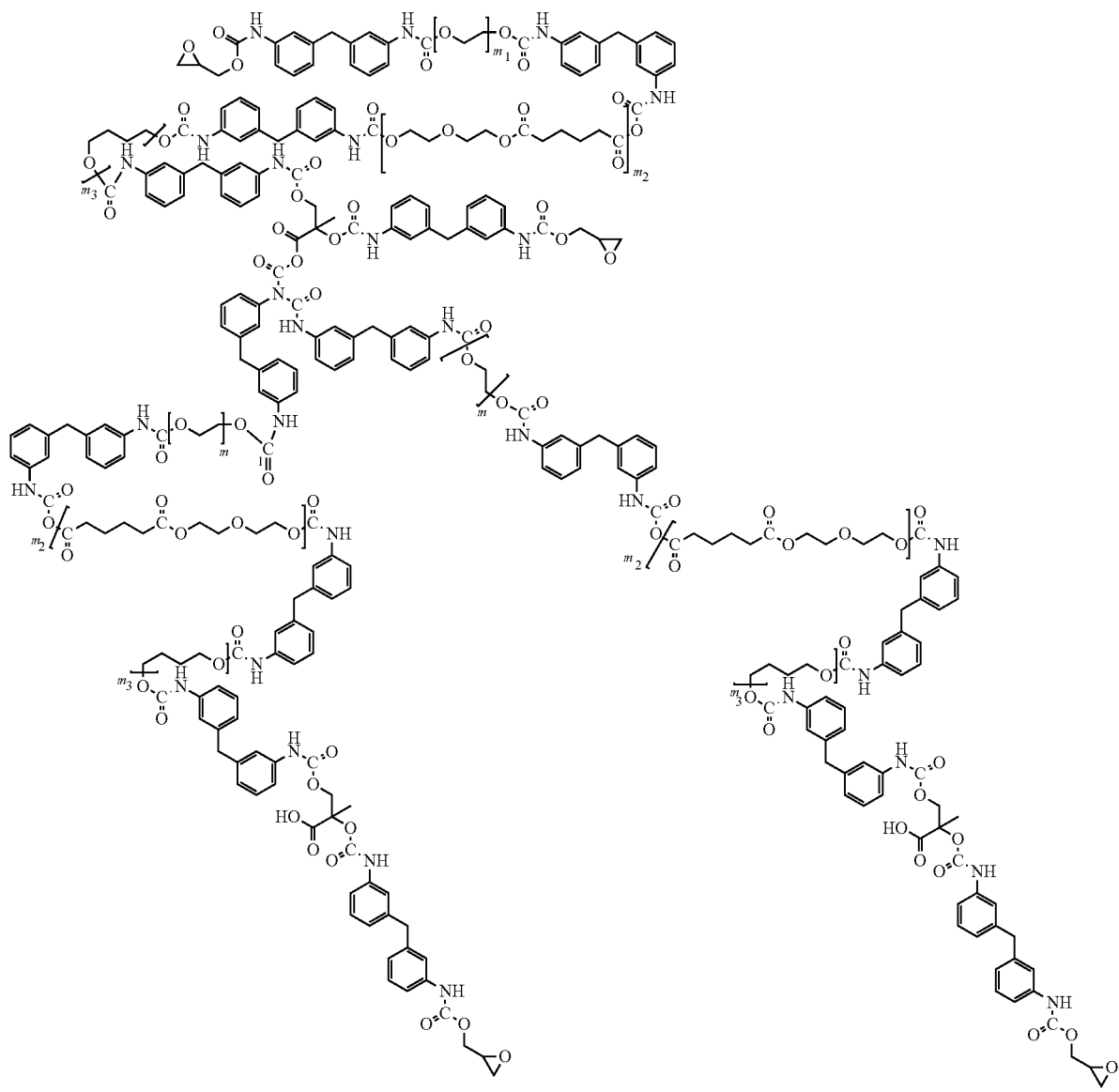

Isocyanate Reaction with Amide to Form Crosslinked Urea

For example, DMPA was used to construct the polymer backbone for the introducing carboxylic acid functionality. This functionality reacts with excess MDI isocyanate around 80 C to form an amide bond. The amide reaction is to slightly cross-link the system and increase its mechanical properties. The active hydrogen of the amide functionally can further react with excess isocyanate to form urea. The combination of amide, urea, and polyurethane hard segments and glycidol functionalities lead to a superior cross-linking system.

The following references, patents, and patent applications are incorporated by reference herein in their entireties.

| | |
|---|---|
| 5,576,072 | Hostettler et al., Process for producing slippery, tenaciously adhering hydrogel coatings . . . |
| 4,990,357 | Karakelle et al., Elastomeric segmented hydrophilic polyetherurethane. based lubricious coatings |
| 6,706,025 | Engelson et al., Lubricous catheters |
| 7,776,956 | Webster et al., Elastomeric segmented hydrophilic polyurethane based coatings |
| 4,119,094 | Micklus et al., Coated substrate having a low coefficient of friction hydrophilic coating and a method of making the same |
| 4,495,229 | Wolf et al., One component heat curing polyurethane coatings . . . |

| | |
|---|---|
| 4,638,017 | Larson et al., Hydrophilic polyurethane polyuria sponge |
| 4,713,448 | Balazs et al., Chemically modified hyaluronic acid preparation . . . |
| 5,041,100 | Rowland et al., Catheter and hydrophilic friction-reducing coating thereon |
| 5,749,837 | Palermo et al., Enhanced lubricity guidewire |
| 5,912,314 | Wolf, Reaction product of mixed uretdiones and a disecondary diamine |
| 5,919,570 | Hostettler et al., Slippery, tenaciously adhering hydrogel coatings . . . |
| 7,193,011 | Kim et al., Method of preparing water dispersible poly(urethane urea) having aromatic-alphatic isocyanate |
| 7,226,972 | Zhao et al. Process for crosslinking hyaluronic acid to polymers |
| 7,652,166 | Haubennestel et al., Biuret compounds . . . |
| 5,104,930 | Rinde et al., Polyurea gel compositions . . . |
| 5,175,229 | Braatz et al., Biocompatible polyuria urethane hydrated polymers |
| 5,576,072 | Hostettler et al., Medical device having hydrophilic coatings . . . |
| 5,688,855 | Stoy et al., Thin film hydrophilic coatings |
| 5,776,611 | Elton et al., Crosslinked hydrogel coatings |
| 20110015724 | Kocher et al., Medical device having hydrophilic coatings |
| 20110021657 | Kocher, Hydrophilic polyurethane solutions |
| 20110021696 | Kocher et al., Hydrophilic polyurethane dispersions |

Also, specifically incorporated by reference herein in its entirety is applicant's in concurrently filed patent application Ser. No. 13/834,810 (U.S. patent Application Pub. No. 2014/0275340), entitled "Modified Hyaluronate Hydrophilic Compositions, Coatings and Methods."

Examples of Composition 1

Example 1

This example describes the preparation of an inventive water loving coating (WLC) glycidyl carbamate dispersion (E-1). A 500 mL four neck reaction kettle with condenser, nitrogen inlet and model Gemini J-KEM temperature controller, mechanical stirrer, and heating mantel was used for resin synthesis. 9.375 g of 4,4'-Methylenebis(phenyl isocyanate) 98% was charged to the reactor. The temperature was held at 40° C. for 40 minutes for solid softening. Next, 4.925 g of Poly[di(ethylene glycol) adipate], average $M_n$ ~500, 27.25 g of Poly(tetrahydrofuran), average $M_n$ ~2,900, was added, in the following order and homogenized by stirring for 5 minutes at 40° C. To this homogenized mixture 53.57 g of Poly (ethylene oxide), average $M_v$ 100,000, powder was added immediately following the addition of 100 g of 1-Methyl-2-pyrrolidinone anhydrous, 99.5%. The solution homogenized by mixing thoroughly for 40 minutes. One drop Dibutyltin dilaurate 95% were added drop wise and the reaction mixture was held at 40° C. for one hour. After one hour 2.8 grams glycidol were added and the temperature was held overnight until reaction completion.

| Example 1 (E-1) | grams | eg. Wt | g/eq |
|---|---|---|---|
| 4,4'-Methylenebis(phenyl isocyanate) | 9.375 | 125 | 0.075 |
| Poly [di(ethylene glycol) adipate] average $M_n$ ~500 | 4.925 | 250 | 0.0197 |
| Poly(tetrahydrofuran) average $M_n$ ~2,900 | 27.25 | 1450 | 0.018793 |
| Poly (ethylene oxide) average $M_v$ 100,000 | 53.57 | 50000 | 0.001071 |
| glycidol | 2.8 | 74 | 0.037838 |
| | | | 0.077402 |

Example 2

This example describes the preparation of an inventive water loving coating (WLC) glycidyl carbamate dispersion (E-2). A 500 mL four neck reaction kettle with condenser, nitrogen inlet and model Gemini J-KEM temperature controller, mechanical stirrer, and heating mantel was used for resin synthesis. 4.787 g of 4,4'-Methylenebis(phenyl isocyanate) 98% was charged to the reactor. The temperature was held at 40° C. for 40 minutes for solid softening. Next, 27.423 g of Poly(tetrahydrofuran) average $M_n$ ~2,900, was added, in the following order and homogenized by stirring for 5 minutes at 40° C. To this homogenized mixture 53.57 g of Poly (ethylene oxide) average $M_v$ 100,000, powder was added immediately following the addition of 50 g of 1-Methyl-2-pyrrolidinone anhydrous, 99.5%. The solution homogenized by mixing thoroughly for 40 minutes. One drop of Dibutyltin dilaurate 95% were added drop wise and the reaction mixture was held at 40° C. for one hour. After one hour 1.8 grams glycidol were added and the temperature was held overnight until reaction completion.

| Example 2 (E-2) | grams | eg. Wt | g/eq |
|---|---|---|---|
| 4,4'-Methylenebis(phenyl isocyanate) | 4.787 | 125 | 0.038296 |
| Poly(tetrahydrofuran) average $M_n$ ~2,900 | 27.423 | 1450 | 0.018912 |
| Poly (ethylene oxide) average $M_v$ 100,000 | 53.57 | 50000 | 0.001071 |
| glycidol | 1.8 | 74 | 0.024324 |
| | | | 0.044308 |

Example 3

This example describes the preparation of an inventive water loving coating (WLC) glycidyl carbamate dispersion (E-3). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 109.99 g of Poly(tetrahydrofuran) average $M_n$ ~2,900 was added and homogenized by stirring for 45 minutes at 40° C. To this homogenized mixture of 290 g of 1-Methyl-2-pyrrolidinone anhydrous, 99.5% was added. The solution homogenized by mixing thoroughly for 40 minutes. Four drops Dibutyltin dilaurate 95% were added drop wise and the reaction mixture was held at 40° C. for one hour. After one hour 5.5051 grams glycidol were added and the temperature was held overnight until reaction completion.

| Example 3 (E-3) | grams | eg. Wt | g/eq |
|---|---|---|---|
| 4,4'-Methylenebis(phenyl isocyanate) | 19.694 | 125 | 0.157552 |
| Poly(tetrahydrofuran) average $M_n$ ~2,900 | 109.99 | 1450 | 0.075855 |
| glycidol | 5.5051 | 74 | 0.074393 |
| | | | 0.150248 |

Example 4

This example describes the preparation of an inventive water loving coating (WLC) glycidyl carbamate dispersion (E-4). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 19.464 g of Poly[di(ethylene glycol) adipate] average $M_n$ ~2,500, 47.23 g of Poly(tetrahydrofuran) average $M_n$ ~2,900 was added, in the following order and homogenized by stirring for 45 minutes at 40° C. To this homogenized mixture 108.28 g of Poly (ethylene oxide) average $M_v$ 100,000, powder was added immediately following the addition of 200 g of 1-Methyl-2-pyrrolidinone anhydrous, 99.5%. The solution homogenized by mixing thoroughly for 250 minutes. Four drops Dibutyltin dilaurate 95% were added drop wise and the reaction mixture was held at 40° C. for one hour. After one hour 4.048 grams glycidol were added and the temperature was held overnight until reaction completion.

| Example 4 (E-4) | grams | eg. Wt | g/eq |
|---|---|---|---|
| 4,4'-Methylenebis(phenyl isocyanate) | 18.964 | 125 | 0.151712 |
| Poly [di(ethylene glycol) adipate] average $M_n$ ~2,500 | 19.464 | 1250 | 0.015571 |
| Poly(tetrahydrofuran) average $M_n$ ~2,900 | 47.23 | 1450 | 0.032572 |
| Poly (ethylene oxide) average $M_v$ 100,000 | 108.28 | 50000 | 0.002166 |
| glycidol | 4.048 | 74 | 0.054703 |
| | | | 0.105012 |

Examples for Composition 2

Example 5

This example describes the preparation of an inventive water loving coating (WLC) glycidyl carbamate dispersion (E-5). A 500 mL four neck reaction kettle with condenser, nitrogen inlet and model Gemini J-KEM temperature controller, mechanical stirrer, and heating mantel was used for resin synthesis. 6.562 g of 4,4'-Methylenebis(phenyl isocyanate) 98% was charged to the reactor. The temperature was held at 40° C. for 40 minutes for solid softening. Next, 14.4 g of Poly [di(ethylene glycol) adipate] average $M_n$ ~2,500, 16.28 g of Poly(tetrahydrofuran) average $M_n$ ~2,900, and 0.6903 g of 2,2-Bis(hydroxymethyl) propionic acid 98% was added, in the following order and homogenized by stirring for 5 minutes at 40° C. To this homogenized mixture 50.0 g of Poly (ethylene oxide) average $M_v$ 100,000, powder was added immediately following the addition of 100 g of 1-Methyl-2-pyrrolidinone anhydrous, 99.5%. The solution homogenized by mixing thoroughly for 40 minutes. Pour drops Dibutyltin dilaurate 95% were added drop wise and the reaction mixture was held at 40° C. for one hour. After one hour 0.3129 grams glycidol were added then 0.0741 grams of water were added after 45 minutes and the temperature was held overnight until reaction completion.

| Example 5 (E-5) | grams | eg. Wt | g/eq |
|---|---|---|---|
| 4,4'-Methylenebis(phenyl isocyanate) | 6.562 | 125 | 0.052496 |
| Poly [di(ethylene glycol) adipate] average $M_n$ ~2500 | 14.4 | 1250 | 0.01152 |
| Poly(tetrahydrofuran) average $M_n$ ~2,900 | 16.28 | 1450 | 0.011228 |
| 2,2-Bis(hydroxymethyl)propionic acid | 0.693 | 67.5 | 0.010267 |
| Poly (ethylene oxide) average $M_v$ 100,000 | 50 | 50000 | 0.001 |
| glycidol | 0.3129 | 74 | 0.004228 |
| | | | 0.038243 |

Example 6

This example describes the preparation of an inventive water loving coating (WLC) glycidyl carbamate dispersion (E-6). A 500 mL four neck reaction kettle with condenser, nitrogen inlet and model Gemini J-KEM temperature controller, mechanical stirrer, and heating mantel was used for resin synthesis. 10.33 g of 4,4'-Methylenebis(phenyl isocyanate) 98% was charged to the reactor. The temperature was held at 40° C. for 40 minutes for solid softening. Next, 25.82 g of Poly [di(ethylene glycol) adipate] average $M_n$ ~2,500, 29.95 g of Poly(tetrahydrofuran) average $M_n$ ~2,900, and 1.38 g of 2,2-Bis(hydroxymethyl) propionic acid 98% was added, in the following order and homogenized by stirring for 5 minutes at 40° C. To this homogenized mixture 30.98 g of Poly (ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour 1.52 grams glycidol were added and the temperature was held overnight until reaction completion.

| Example 6 (E-6) | grams | eg. Wt | g/eq |
|---|---|---|---|
| 4,4'-Methylenebis(phenyl isocyanate) | 10.33 | 125 | 0.08264 |
| Poly [di(ethylene glycol) adipate] average $M_n$ ~2500 | 25.82 | 1250 | 0.020656 |
| Poly(tetrahydrofuran) average $M_n$ ~2,900 | 29.95 | 1450 | 0.020655 |
| 2,2-Bis(hydroxymethyl)propionic acid | 1.38 | 67.5 | 0.020444 |
| Poly (ethylene oxide) average $M_v$ 100,000 | 30.98 | 50000 | 0.00062 |
| glycidol | 1.52 | 74 | 0.020541 |
| | | | 0.082916 |

Example 7

This example describes the preparation of an inventive water loving coating (WLC) glycidyl carbamate dispersion (E-7). A 500 mL four neck reaction kettle with condenser, nitrogen inlet and model Gemini J-KEM temperature controller, mechanical stirrer, and heating mantel was used for resin synthesis. 16.8 g of 1,6-Diisocyanatohexane>99.0% was charged to the reactor. The temperature was held at 40° C. for 40 minutes for solid softening. Next, 62.5 g of Poly [di(ethylene glycol) adipate] average $M_n$ ~2,500, 72.5 g of Poly(tetrahydrofuran) average $M_n$ ~2,900, and 3.35 g of 2,2-Bis(hydroxymethyl)propionic acid 98% was added, in the following order and homogenized by stirring for 5 minutes at 40° C. To this homogenized mixture 1-Methyl-2-pyrrolidinone anhydrous, 99.5% was added. The solution homogenized by mixing thoroughly for 40 minutes. Four drops Dibutyltin dilaurate 95% were added drop wise and the reaction mixture was held at 40° C. for one hour. After one hour 3.7 grams glycidol were added and the temperature was held overnight until reaction completion.

| Example 7 (E-7) | grams | eg. Wt | g/eq |
|---|---|---|---|
| 1,6-Diisocyanatohexane | 16.8 | 84 | 0.2 |
| Poly [di(ethylene glycol) adipate] average $M_n$ ~2,500 | 62.5 | 1250 | 0.05 |
| Poly(tetrahydrofuran) average $M_n$ ~2,900 | 72.5 | 1450 | 0.05 |
| 2,2-Bis(hydroxymethyl)propionic acid | 3.35 | 67.5 | 0.04963 |
| Poly (ethylene oxide) average $M_v$ 100,000 | 72.5 | 50000 | 0.00145 |
| glycidol | 3.7 | 74 | 0.05 |
| | | | 0.20108 |

Examples for Composition 3

Example 8

This example describes the preparation of an inventive water loving coating (WLC) glycidyl carbamate dispersion (E-8). A 500 mL four neck reaction kettle with condenser, nitrogen inlet and model Gemini J-KEM temperature controller, mechanical stirrer, and heating mantel was used for resin synthesis. 20.14 g of 4,4'-Methylenebis(cyclohexyl isocyanate), mixture of isomers 90% was charged to the reactor. The temperature was held at 40 degree C. for 40 minutes for solid softening. Next, 62.16 g of Poly(tetrahydrofuran) average $M_n$ ~2,900, and 3.061 g of 2,2-Bis(hydroxymethyl)propionic acid 98% was added, in the following order and homogenized by stirring for 5 minutes at 40° C. To this homogenized mixture 43.34 g of Poly (ethylene oxide) average $M_v$ 100,000, powder was added immediately following the addition of 300 g of 1-Methyl-2-pyrrolidinone anhydrous, 99.5%. The solution homogenized by mixing thoroughly for 40 minutes. Six drops Dibutyltin dilaurate 95% were added drop wise and the reaction mixture was held at 40° C. for one hour. After one hour 3.2192 g of Adipic acid dihydrazide≥98% were added and mixed for two hours. To this homogenized mixture 7.5 grams glycidol were added and the temperature was held overnight until reaction completion.

| Example 8 (E-8) | Grams | eg. Wt | g/eq |
|---|---|---|---|
| of 4,4'-Methylenebis(cyclohexyl isocyanate) | 20.14 | 131 | 0.153740458 |
| Poly(tetrahydrofuran) average $M_n$ ~2,900 | 43.34 | 1450 | 0.029889655 |
| 2,2-Bis(hydroxymethyl)propionic acid | 3.061 | 67.5 | 0.045348148 |
| Poly (ethylene oxide) average $M_v$ 100,000 | 62.16 | 50000 | 0.0012432 |
| Adipic acid dihydrazide | 3.2192 | 87.1 | 0.036959816 |
| glycidol | 7.5 | 74 | 0.101351351 |
| | | | 0.214792171 |

Example 9

This example describes the preparation of an inventive water loving coating (WLC) glycidyl carbamate dispersion (E-9). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 134.85 g of Poly(tetrahydrofuran) average $M_n$ ~2,900, was added and homogenized by stirring for 40 minutes at 40° C. To this homogenized mixture 216.75 g of Poly (ethylene oxide) average $M_v$ 100,000, powder was added immediately following the addition of 290 g of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour 1.956 g of Adipic acid dihydrazide≥98% were added and mixed for two hours. To this homogenized mixture 0.33 grams glycidol were added and the temperature was held overnight until reaction completion.

| Example 9 (E-9) | grams | eg. Wt | g/eq |
|---|---|---|---|
| 4,4'-Methylenebis(phenyl isocyanate) | 134.85 | 125 | 1.0788 |
| Poly (ethylene oxide) average $M_v$ 100,000 | 216.75 | 50000 | 0.004335 |
| Adipic acid dihydrazide | 1.956 | 87.1 | 0.0225028 |
| glycidol | 0.33 | 74 | 0.004459 |
| Poly(tetrahydrofuran) average $M_n$ ~2,900 | 134.85 | 1450 | 0.093 |
| | | | 0.1242968 |

Example 10

This example describes the preparation of an inventive water loving coating (WLC) glycidyl carbamate dispersion (E-10). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 33.379 g of Poly [di(ethylene glycol) adipate] average $M_n$ ~2,500, 47.255 g of Poly(tetrahydrofuran) average $M_n$ ~2,900, and 2.000 g of 2,2-Bis(hydroxymethyl)propionic acid 98% was added, in the following order and homogenized by stirring for 5 minutes at 40° C. To this homogenized mixture 216.748 g of Poly (ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour 1.956 g of Adipic acid dihydrazide≥98% were added and mixed for two hours. To this homogenized mixture 0.33 grams glycidol were added and the temperature was held overnight until reaction completion.

| Example 10 (E-10) | grams | eg. Wt | g/eq |
|---|---|---|---|
| 4,4'-Methylenebis(phenyl isocyanate) | 18.964 | 125 | 0.151712 |
| Poly [di(ethylene glycol) adipate] average $M_n$ 2500 | 33.379 | 1250 | 0.0267032 |
| Poly(tetrahydrofuran) average $M_n$ ~2,900, | 47.255 | 1450 | 0.03258 |
| 2,2-Bis(hydroxymethyl)propionic acid | 2.000g | 67.5 | 0.029629 |

-continued

| Example 10 (E-10) | grams | eg. Wt | g/eq |
|---|---|---|---|
| Poly (ethylene oxide) average $M_v$ 100,000 | 216.748 | 50000 | 0.04335 |
| Adipic acid dihydrazide | 1.956 | 87.1 | 0.02245569 |
| glycidol | 0.33 | 74 | 0.00445 |
| | | | 0.15916789 |

Example 11

This example describes the preparation of an inventive water loving coating (WLC) glycidyl carbamate dispersion (E-11). A 500 mL four neck reaction kettle with condenser, nitrogen inlet and model Gemini J-KEM temperature controller, mechanical stirrer, and heating mantel was used for resin synthesis. 18.972 g of 4,4'-Methylenebis(phenyl isocyanate) 98% was charged to the reactor. The temperature was held at 40° C. for 40 minute for solid softening. Next, 33.29 g of Poly [di(ethylene glycol) adipate] average $M_n$ ~2,500, 47.92 g of Poly(tetrahydrofuran) average $M_n$ ~2,900, and 1.994 g of 2,2-Bis(hydroxymethyl)propionic acid 98% was added, in the following order and homogenized by stirring for 5 minutes at 40° C. To this homogenized mixture 43.349 g of Poly (ethylene oxide) average $M_v$ 100,000, powder was added immediately following the addition of 290 g of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour 1.958 g of Adipic acid dihydrazide≥98% were added and mixed for two hours. To this homogenized mixture 2.426 grams glycidol were added and the temperature was held overnight until reaction completion.

| Example 11 (E-11) | grams | eg. Wt | g/eq |
|---|---|---|---|
| 4,4'-Methylenebis(phenyl isocyanate) | 18.792 | 125 | 0.150336 |
| Poly [di(ethylene glycol) adipate] average $M_n$ ~2,500 | 33.29 | 1250 | 0.026632 |
| Poly(tetrahydrofuran) average $M_n$ ~2,900 | 47.92 | 1450 | 0.03304828 |
| 2,2-Bis(hydroxymethyl)propionic acid | 1.994 | 67.5 | 0.02954074 |
| Poly (ethylene oxide) average $M_v$ 100,000 | 43.349 | 50000 | 0.00086698 |
| Adipic acid dihydrazide | 1.958 | 87.1 | 0.02247991 |
| glycidol | 2.426 | 74 | 0.03278378 |
| | | | 0.14535169 |

Examples for Composition 4

Example 12

This example describes the preparation of an inventive water loving coating (WLC) glycidyl carbamate dispersion (E-12). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minute for solid softening. Next, 40.456 g of Poly [di(ethylene glycol) adipate] average $M_n$ ~2,500, 45.911 g of Poly(tetrahydrofuran) average $M_n$ ~2,900, and 1.939 g of 2,2-Bis(hydroxymethyl)propionic acid 98% was added, in the following order and homogenized by stirring for 5 minutes at 40° C. To this homogenized mixture 210.0 g of Poly (ethylene oxide) average $M_v$ 100,000, powder was added immediately following the addition of 290 g of 1-Methyl-2-pyrrolidinone anhydrous, 99.5%. The solution homogenized by mixing thoroughly for 250 minutes. Four drops Dibutyltin dilaurate 95% were added drop wise and the reaction mixture was held at 40° C. for one hour. After one hour 1.37 g of Adipic acid dihydrazide≥98% were added and mixed for two hours. To this homogenized mixture 1.436 grams glycidol were added and the temperature was held overnight until reaction completion. The final addition involved 0.3533 grams water to form a urea.

| Example 12 (E-12) | grams | eg. Wt | g/eq |
|---|---|---|---|
| 4,4'-Methylenebis(phenyl isocyanate) | 18.964 | 125 | 0.151712 |
| Poly [di(ethylene glycol) adipate] average $M_n$ ~2,500 | 40.456 | 1250 | 0.0323648 |
| Poly(tetrahydrofuran) average $M_n$ ~2,900 | 45.911 | 1450 | 0.031662759 |
| 2,2-Bis(hydroxymethyl)propionic acid | 1.939 | 67.5 | 0.028725926 |
| Poly (ethylene oxide) average $M_v$ 100,000 | 210 | 50000 | 0.0042 |
| Adipic acid dihydrazide | 1.37 | 87.1 | 0.015729047 |
| glycidol | 1.436 | 74 | 0.019405405 |
| | | | 0.132087937 |
| WATER | 0.3533 | 18 | 0.01963 |

Example 13

This example describes the preparation of an inventive water loving coating (WLC) glycidyl carbamate dispersion (E-13). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 33.38 g of Poly [di(ethylene glycol) adipate] average $M_n$ ~2500, 47.23 g of Poly(tetrahydrofuran) average $M_n$ ~2,900 was added, and 1.99 g of 2,2-Bis(hydroxymethyl)propionic acid 98% was added, in the following order and homogenized by stirring for 45 minutes at 40° C. To this homogenized mixture 53.57 g of Poly (ethylene oxide) average $M_v$ 100,000, powder was added immediately following the addition of 200 g of 1-Methyl-2-pyrrolidinone anhydrous, 99.5%. The solution homogenized by mixing thoroughly for 250 minutes. Four drops Dibutyltin dilaurate 95% were added drop wise and the reaction mixture was held at 40° C. for one hour. After one hour 1.354 g of Adipic acid dihydrazide≥98% were added and mixed for two hours. To this homogenized mixture 2.427 grams glycidol were added and the temperature was held overnight until reaction completion. The final addition involved 0.2409 grams water to form a urea.

| Example 13 (E-13) | grams | eg. Wt | g/eq |
|---|---|---|---|
| 4,4'-Methylenebis(phenyl isocyanate) | 18.964 | 125 | 0.151712 |
| Poly [di(ethylene glycol) adipate] average $M_n$ ~2,500 | 33.38 | 1250 | 0.026704 |

-continued

| Example 13 (E-13) | grams | eg. Wt | g/eq |
|---|---|---|---|
| Poly(tetrahydrofuran) average $M_n$ ~2,900 | 47.25 | 1450 | 0.032586207 |
| 2,2-Bis(hydroxymethyl)propionic acid | 1.9999 | 67.5 | 0.029628148 |
| Poly (ethylene oxide) average $M_v$ 100,000 | 53.57 | 50000 | 0.0010714 |
| Adipic acid dihydrazide | 1.354 | 87.1 | 0.01554535 |
| glycidol | 2.427 | 74 | 0.032797297 |
|  |  |  | 0.138332403 |
| WATER | 0.2409 | 18 | 0.013382 |

Examples for Composition 5

Example 14

This example describes the preparation of an inventive water-loving coating (WLC) glycidyl carbamate dispersion (E-14). A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 40.457 g of Poly [di(ethylene glycol) adipate] average $M_n$ ~2,500, 45.911 g of Poly(tetrahydrofuran) average $M_n$ ~2,900, and 1.939 g of 2,2-Bis(hydroxymethyl)propionic acid 98% was added, in the following order and homogenized by stirring for 5 minutes at 40° C. To this homogenized mixture 210.71 g of Poly (ethylene oxide) average $M_v$ 100,000, powder was added immediately following the addition of 290 g of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40° C. for one hour. After one hour 1.3789 g of Adipic acid dihydrazide≥98% were added and mixed for two hours. To this homogenized mixture 1.436 grams glycidol were added and the temperature was held overnight until reaction completion.

| Example 14 (E-14) POLYURETHANE UREA W/EXCESS NCO | grams | eg. Wt | g/eq |
|---|---|---|---|
| 4,4'-Methylenebis(phenyl isocyanate) | 18.964 | 125 | 0.151712 |
| Poly [di(ethylene glycol) adipate] average $M_n$ ~2,500 | 40.457 | 1250 | 0.0323656 |
| Poly(tetrahydrofuran) average $M_n$ ~2,900 | 45.911 | 1450 | 0.031662759 |
| 2,2-Bis(hydroxymethyl)propionic acid 98% | 1.939 | 67.5 | 0.028725926 |
| Adipic acid dihydrazide | 1.3789 | 87.1 | 0.015831228 |
| glycidol | 1.436 | 74 | 0.019405405 |
|  |  |  | 0.127990918 |

Examples for the Cross-Linking Reaction

Example 15

This example describes the preparation of an inventive water loving coating (WLC) glycidyl carbamate dispersion (E-15). A 500 mL four neck reaction kettle with condenser, nitrogen inlet and model Gemini J-KEM temperature controller, mechanical stirrer, and heating mantle was used for resin synthesis. 10.33 g of 4,4'-Methylenebis(phenyl isocyanate) 98% was charged to the reactor. The temperature was held at 40° C. for 40 minutes for solid softening. Next, 25.82 g of Poly [di(ethylene glycol) adipate] average $M_n$ ~2,500, 29.95 g of Poly(tetrahydrofuran) average $M_n$ ~2,900, and 1.38 g of 2,2-Bis(hydroxymethyl) propionic acid 98% was added, in the following order and homogenized by stirring for 5 minutes at 40° C. To this homogenized mixture 30.98 g of Poly (ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 60° C. for one hour for homopolymerization. After one hour 1.52 grams glycidol were added and the temperature was held for 72 hours.

| Example 15 (E-15) | grams | eg. Wt | g/eq |
|---|---|---|---|
| 4,4'-Methylenebis(phenyl isocyanate) | 8.264 | 125 | .066112 |
| Poly [di(ethylene glycol) adipate] average $M_n$ ~2500 | 20.656 | 1250 | .0165248 |
| Poly(tetrahydrofuran) average $M_n$ ~2,900 | 23.96 | 1450 | .016524 |
| 2,2-Bis(hydroxymethyl)propionic acid | 1.104 | 67.5 | .0163552 |
| Poly (ethylene oxide) average $M_v$ 100,000 | 24.78 | 50000 | .000496 |
| glycidol | 1.21 | 74 | .016432 |
|  |  |  | .0663328 |

Example 16

This example describes the preparation of an inventive water-loving coating (WLC) Epoxy urethane alkylene oxide reactive coating compositions. A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40 degree C. for 40 minutes for solid softening. Next, 109.99 g of Poly(tetrahydrofuran) average $M_n$ ~2,900 was added and homogenized by stirring for 45 minutes at 40.degree. C. To this homogenized mixture of 290 g of 1-Methyl-2-pyrrolidinone anhydrous, 99.5% was added. The solution homogenized by mixing thoroughly for 40 minutes. Four drops Dibutyltin dilaurate 95% were added drop wise and the reaction mixture was held at 40 degrees C. for one hour. After one hour 5.5051 grams glycidol were added and the temperature was held overnight until reaction completion.

Example 17

This example describes the preparation of an inventive water-loving coating (WLC) Epoxy urethane ester carboxylic acid alkylene oxide reactive coating compositions. A 500 mL four neck reaction kettle with condenser, nitrogen inlet and model Gemini J-KEM temperature controller, mechanical stirrer, and heating mantel was used for resin synthesis. 16.8 g of 1,6-Diisocyanatohexane>99.0% was charged to the reactor. The temperature was held at 40° C. for 40 minutes for solid softening. Next, 62.5 g of Poly [di(ethylene glycol) adipate] average $M_n$ ~2,500, 72.5 g of Poly(tetrahydrofuran) average $M_n$ ~2,900, and 3.35 g of 2,2-Bis(hydroxymethyl)propionic acid 98% was added, in the following order and homogenized by stirring for 5 minutes at 40° C. To this homogenized mixture 150 grams of Poly (ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at ° C. for one hour. After one hour 3.7 grams glycidol were added and the temperature was held overnight until reaction completion.

Example 18

This example describes the preparation of an inventive water-loving coating (WLC) Epoxy urethane urea carboxylic acid alkylene oxide reactive coating compositions. A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 33.379 g of Poly [di(ethylene glycol) adipate] average $M_n$ ~2,500, 47.255 g of Poly(tetrahydrofuran) average $M_n$ ~2,900, and 2.000 g of 2,2-Bis(hydroxymethyl)propionic acid 98% was added, in the following order and homogenized by stirring for 5 minutes at 40° C. To this homogenized mixture 216.748 g of Poly (ethylene oxide) average $M_v$ 100,000, powder was added immediately following the addition of 1-Methyl-2-pyrrolidinone anhydrous, 99.5%. The solution homogenized by mixing thoroughly for 40 minutes. Four drops Dibutyltin dilaurate 95% were added drop wise and the reaction mixture was held at 40 degrees C. for one hour. After one hour 1.956 g of Adipic acid dihydrazide≥98% were added and mixed for two hours. To this homogenized mixture 0.33 grams glycidol were added and the temperature was held overnight until reaction completion.

Example 19

This example describes the preparation of an inventive water loving coating (WLC) Epoxy urethane urea carboxylic acid alkylene oxide reactive coating compositions. A 500 mL four neck reaction kettle with condenser, nitrogen inlet and model Gemini J-KEM temperature controller, mechanical stirrer, and heating mantel was used for resin synthesis. 18.964 g of 4,4'-Methylenebis(phenyl isocyanate) 98% was charged to the reactor. The temperature was held at 40° C. for 40 minutes for solid softening. Next, 40.456 g of Poly [di(ethylene glycol) adipate] average $M_n$ ~2,500, 45.911 g of Poly(tetrahydrofuran) average $M_n$ ~2,900, and 1.939 g of 2,2-Bis(hydroxymethyl)propionic acid 98% was added, in the following order and homogenized by stirring for 5 minutes at 40° C. To this homogenized mixture 210.0 g of Poly (ethylene oxide) average $M_v$ 100,000, powder was added immediately following the addition of 290 g of 1-Methyl-2-pyrrolidinone anhydrous, 99.5%. The solution homogenized by mixing thoroughly for 250 minutes. Four drops Dibutyltin dilaurate 95% were added drop wise and the reaction mixture was held at 40 degrees C. for one hour. After one hour 1.37 g of Adipic acid dihydrazide≥98% were added and mixed for two hours. To this homogenized mixture 1.436 grams glycidol were added and the temperature was held overnight until reaction completion. The final addition involved 0.3533 grams water to form a urea.

Summary of WLC Connectivity:

Basecoat terminal epoxy groups react with top coat epoxy groups through ARM amine functionality which increase adhesive strength. Basecoat chemistry contains Easaqua XM-502, which is added during the base coat mixing step. This aqueous isocyanate contains mpeg for use in water based applications. When this material is added to basecoat the isocyanate reacts with the carboxylic acid and open epoxide hydroxyl groups for basecoat cohesive strength. Easaqua XM-502 also reacts with top coat ARM and open hydroxyl groups for adhesive strength.

Once crosslinked, with Easaqua XM-502, then the base coat becomes a hydrogel. The hydrogel crosslinks take in water and swell via soft segments (Terethane, PEO and PEDGA) to render the coating water loving with high lubricity. Crosslink chemistry allows water to become retained within the walls of the soft segment without going into solution. This chemical and physical process leads to an extremely durable and lubricious coating.

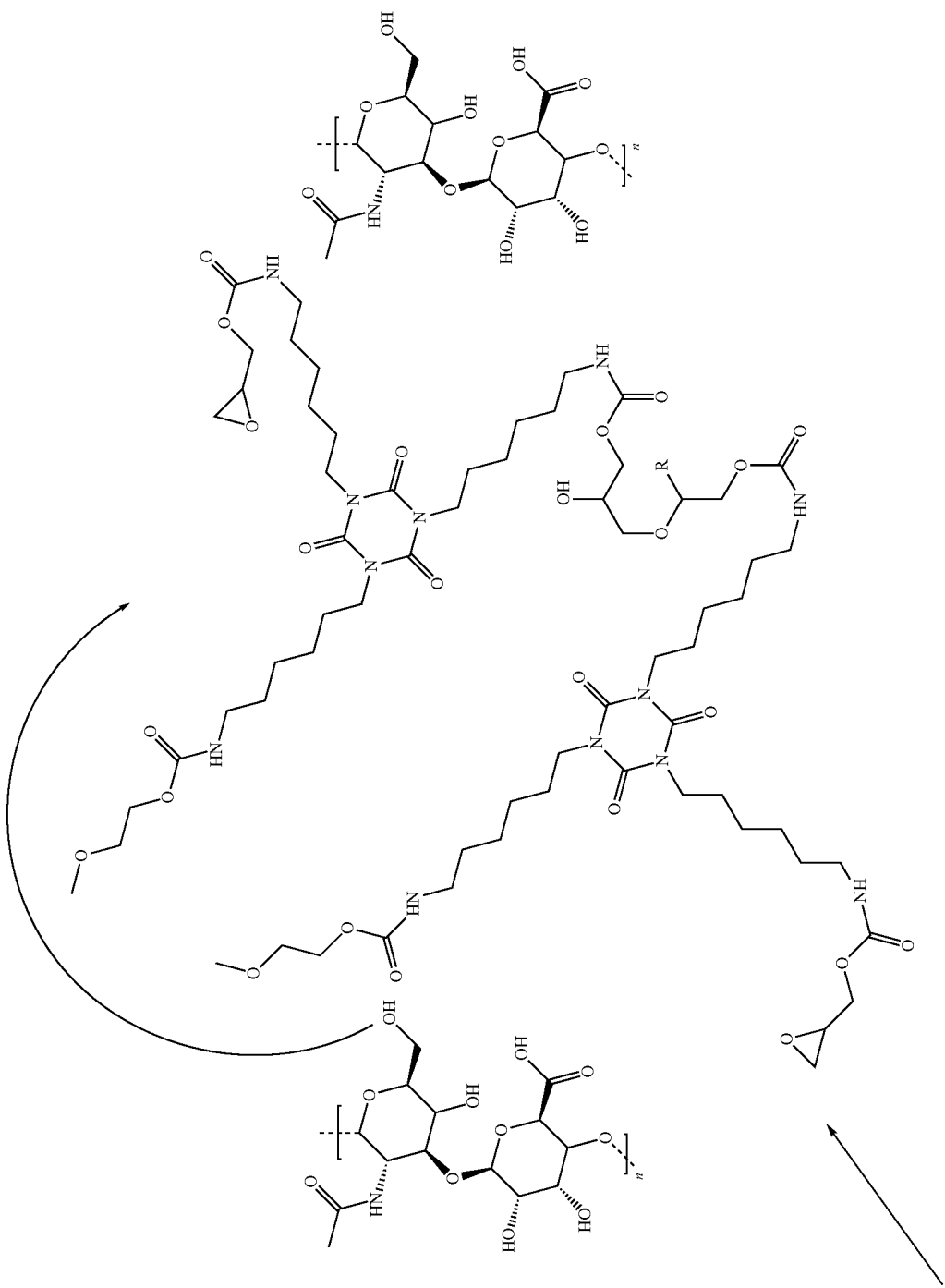

-continued
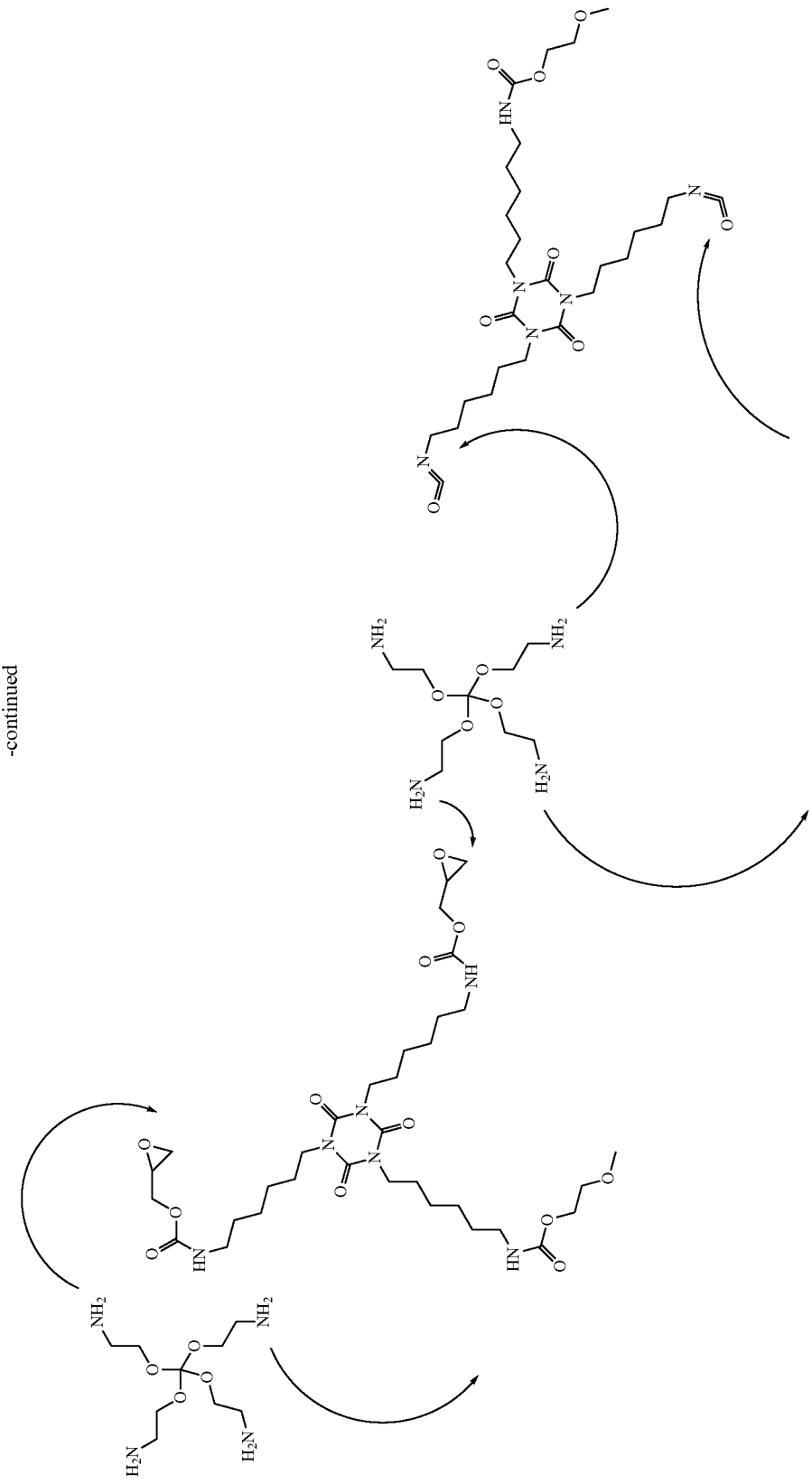

-continued
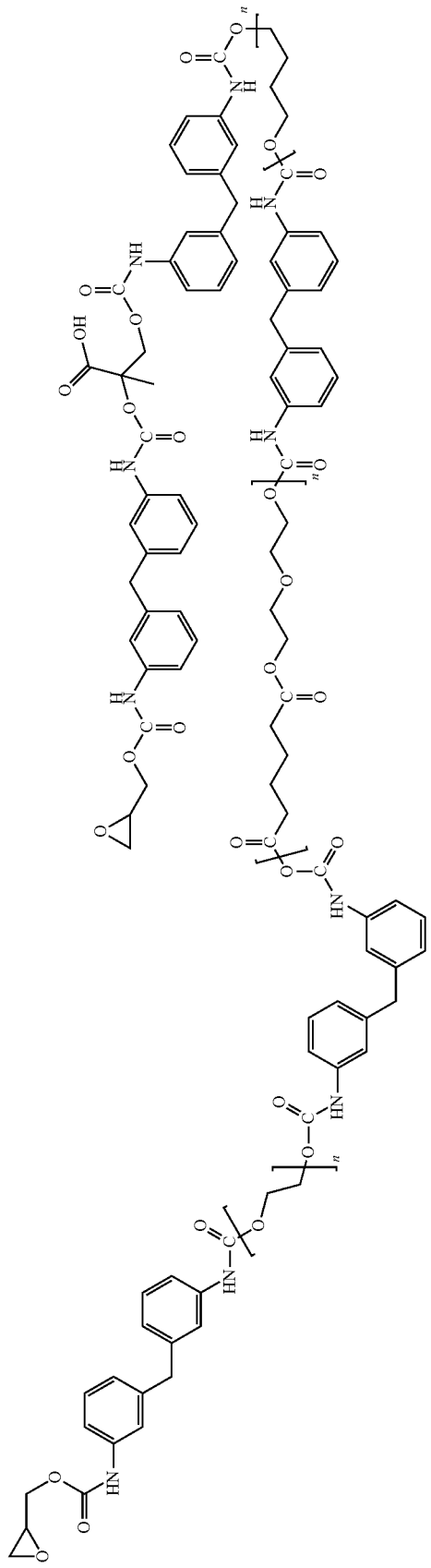

WLC Oxirane Connections

A resin sample of an aqueous polyurethane polymer was submitted to NSL Analytical Laboratories on Nov. 2, 2009 for characterization of the polymer. Various Mass Spectrometry techniques were utilized in this characterization, including Electro-Spray Ionization (ESI), Matrix Assisted Laser Desorption Ionization (MALDI) and Chemical Ionization (CI).

The following are abbreviations are used to describe findings:

| | |
|---|---|
| GA | glycidol alcohol |
| DEG | diethylene glycol |
| DMPA | dimethylolpropionic acid |
| DEGA | diethyleneglycol adipate |
| MDI | methylene-diisocyanate |
| PEG | polyethylene glycol |
| PDEGA | polydiethyleneglycol adipate |

Abbreviations Used to Describe Findings

The sample was analyzed by 1H NMR with the sample dissolved in TCE. This was able to provide the monomer ratios listed below.

| | |
|---|---|
| MDI | 1 mol |
| Adipic | 2.875 mol |
| DEG | 3.075 mol |
| PTMEG (poly THF) | 11 mol of THF |
| PEG (i.e. PEO) | 24 moles of EO |
| Glycidolcarbonate | 0.5 mol |
| DMPA | 0.27 mol |

Monomer Ratios Determined by Proton NMR

Coating Example Composition 1

Materials as synthesized above were then applied to substrates noted below in the following fashion:

Coating Polyurethane Tungsten Loaded Jacket a. An aqueous and or solvent dispersion basecoat was prepared from 8.8 g of composition 1 AND 0.2 Easaqua XM-502 were then added to the formulation and stirred at 900 rpm for 15 minutes.

b. Basecoat (of this invention) was applied to the polyurethane jacketed wire, by dip coating, at a set speed for a desired film thickness c. The basecoat was then cured either at ambient or thermally until no longer-tacky d. An aqueous dispersion topcoat was prepared with crosslinker in the following order: (1) 0.005 grams Poly(ethylene oxide), 4-arm, amine terminated average $M_n$ ~10,000 was added to a one ounce bottle then (2) 0.02 '956 patent. To this crosslinker 11.576 grams of modified hyaluronan top coat formulated resin was added and crosslinker was stirred at 1800 rpm for 5 minutes e. Topcoat of the concurrently filed application noted above was then applied at a set speed for desired film thickness f. The coating was then cured at ambient or thermally until fully cured g. The final cured product resulted in a highly lubricious coating Coating Metal Wire Substrate with Adhesion Promoter
Preparation of Adhesion Promoter
i. 100 mL ETOH (ETOH anhydrous) provided by Sigma
ii. Add 5.0 gram water
iii. Stir 10 minutes
iv. Add 3.84 grams 3-aminopropyltriethoxysilane (Provided by Gelest)
v. Mix 5 minutes
a. Coating wire with adhesion promoter
vi. Pour adhesion promoter into 100 mL burette (use shaker to mix)
vii. Place wire in graduated cylinder solution for 10 minutes
viii. Take wire out of solution and place in 125 C oven for 10 minutes
Polyurethane Tungsten Loaded Jacket
b. An aqueous and or solvent dispersion basecoat was prepared from 8.8 g of composition 1 AND 0.015 Easaqua XM-502 were then added to the formulation and stirred at 900 rpm for 15 minutes.
c. The wire from step a-viii was taken out of the 125 C oven for coating
d. Basecoat was applied to the metal wire substrate with adhesion promoter, by dip coating, at a set speed for a desired film thickness
e. The basecoat was then cured either at ambient or thermally until no longer-tacky
f. An aqueous dispersion intermediate layer was prepared with Easaqua XM-502 (0.015) crosslinker, '956 patent and adipic acid dihydrazide (0.02). To this crosslinker 8.8 grams composition 1 plus water were formulated and stirred at 1800 RPM for 5 minutes. The intermediate layer contained 0.01 TPP catalyst.
g. Intermediate layer was then applied at a set speed for desired film thickness
h. The intermediate layer was then cured either at ambient or thermally until no longer-tacky
i. An aqueous dispersion topcoat was prepared with crosslinker in the following order: (1) 0.01 grams adipic acid dihydrazide was added to a one ounce bottle then (2) 0.01 grams PZ-28 To this crosslinker 11.576 grams composition 2 was added to the crosslinker, which was stirred at 1800 rpm for 5 minutes
j. Topcoat was then applied at a set speed for desired film thickness
k. The coating was then cured at ambient or thermally until fully cured
l. The final cured product resulted in a highly lubricious coating Coating Example Composition 3

Materials were then applied to substrates noted below in the following fashion:
Coating Polyurethane Tungsten Loaded Jacket
h. An aqueous and or solvent dispersion basecoat was prepared from 8.8 g of composition 3 AND 0.2 Polyaziridine PZ-28 were then added to the formulation and stirred at 900 rpm for 15 minutes.
i. Basecoat was applied to the polyurethane jacketed wire, by dip coating, at a set speed for a desired film thickness
j. The basecoat was then cured either at ambient or thermally until no longer-tacky
k. An aqueous dispersion topcoat was prepared with crosslinker in the following order: (1) 0.002 grams Poly(ethylene oxide), 4-arm, amine terminated average $M_n$ ~10,000 was added to a one ounce bottle then (2) 0.0252 grams '956 patent. To this crosslinker 11.576 grams of modified hyaluronan top coat formulated resin was added and crosslinker was stirred at 1800 rpm for 5 minutes
l. Topcoat was then applied at a set speed for desired film thickness
m. The coating was then cured at ambient or thermally until fully cured
n. The final cured product resulted in a highly lubricious coating Coating Metal Wire Substrate with Adhesion Promoter
Preparation of Adhesion Promoter
i. 100 mL ETOH (ETOH anhydrous) provided by Sigma
ii. Add 5.0 gram water
iii. Stir 10 minutes
l. Add 3.84 grams 3-aminoethyltriethoxysilane (Provided by Gelest)
iv.
v. Mix 5 minutes
m. Coating wire with adhesion promoter
vi. Pour adhesion promoter into 100 mL burette (use shaker to mix)
vii. Place wire in graduated cylinder solution for 10 minutes
viii. Take wire out of solution and place in 125 C oven for 10 minutes Polyurethane Tungsten Loaded Jacket
n. An aqueous and or solvent dispersion basecoat was prepared from 8.8 g of composition 3 AND 0.2 Polyaziridine PZ-28 were then added to the formulation and stirred at 900 rpm for 15 minutes.
o. The wire from stop viii was taken out of the 125 C oven for coating
p. Basecoat was applied to the metal wire substrate with adhesion promoter, by dip coating, at a set speed for a desired film thickness
q. The basecoat was then cured either at ambient or thermally until no longer-tacky
r. An aqueous dispersion topcoat was prepared with crosslinker in the following order: (1) 0.002 grams Poly(ethylene oxide), 4-arm, amine terminated average $M_n$ ~10,000 was added to a one ounce bottle then (2) 0.0252 grams '956 patent. To this crosslinker 11.576 grams of modified hyaluronan top coat formulated resin was added and crosslinker was stirred at 1800 rpm for 5 minutes
s. Topcoat was then applied at a set speed for desired film thickness
t. The coating was then cured at ambient or thermally until fully cured
u. The final cured product resulted in a highly lubricious coating Coating Example Composition 5

Materials were then applied to substrates noted below in the following fashion:
Coating Polyurethane Tungsten Loaded Jacket
o. An aqueous and or solvent dispersion basecoat was prepared from 8.8 g of composition 5 and stirred at 900 rpm for 15 minutes.
p. Basecoat was applied to the polyurethane jacketed wire, by dip coating, at a set speed for a desired film thickness
q. The basecoat was then cured either at ambient or thermally until no longer-tacky
r. An aqueous dispersion topcoat was prepared with crosslinker in the following order: (1) 0.0005 grams Poly(ethylene oxide), 4-arm, amine terminated average $M_n$ ~10,000 was added to a one ounce bottle then (2) 0.0000271 grams '956 patent. To this crosslinker 11.576 grams of modified hyaluronan top coat formulated resin was added and crosslinker was stirred at 1800 rpm for 5 minutes
s. Topcoat was then applied at a set speed for desired film thickness
t. The coating was then cured at ambient or thermally until fully cured
u. The final cured product resulted in a highly lubricious coating Coating Metal Wire Substrate with Adhesion Promoter
Preparation of Adhesion Promoter
i. 100 mL ETOH (ETOH anhydrous) provided by Sigma
ii. Add 5.0 gram water
iii. Stir 10 minutes
iv. Add 3.84 grams 3-aminopropyltriethoxysilane (Provided by Gelest)
v. Mix 5 minutes
v. Coating wire with adhesion promoter
vi. Pour adhesion promoter into 100 mL burette (use shaker to mix)
vii. Place wire in graduated cylinder solution for 10 minutes
viii. Take wire out of solution and place in 125 C oven for 10 minutes Polyurethane Tungsten Loaded Jacket
v. An aqueous and or solvent dispersion basecoat was prepared from 8.8 g of composition 5 and stirred at 900 rpm for 15 minutes.
w. Basecoat was applied to the polyurethane jacketed wire, by dip coating, at a set speed for a desired film thickness
x. The basecoat was then cured either at ambient or thermally until no longer-tacky
y. An aqueous dispersion topcoat was prepared with crosslinker in the following order: (1) 0.0005 grams Poly(ethylene oxide), 4-arm, amine terminated average $M_n$ ~10,000 was added to a one ounce bottle then (2) 0.0000271 grams '956 patent. To this crosslinker 11.576 grams of modified hyaluronan top coat formulated resin was added and crosslinker was stirred at 1800 rpm for 5 minutes
z. Topcoat was then applied at a set speed for desired film thickness
aa. The coating was then cured at ambient or thermally until fully cured
w. The final cured product resulted in a highly lubricious coating Coating Example Composition 7

Materials were then applied to substrates noted below in the following fashion:
Coating Polyurethane Tungsten Loaded Jacket
bb. An aqueous and or solvent dispersion basecoat was prepared from 8.8 g of composition 7 AND 0.2 Easaqua XM-502 were then added to the formulation and stirred at 900 rpm for 15 minutes Basecoat was applied to the polyurethane jacketed wire, by dip coating, at a set speed for a desired film thickness
cc. The basecoat was then cured either at ambient or thermally until no longer-tacky dd. An aqueous dispersion topcoat was prepared with crosslinker in the following order: (1) 0.02 grams Poly(ethylene oxide), 4-arm, amine terminated average $M_n$ ~10,000 was added to a one ounce bottle then (2) 0.015 grams '956 patent. To this crosslinker 11.576 grams of modified hyaluronan top coat formulated resin was added and crosslinker was stirred at 1800 rpm for 5 minutes ee. Topcoat was then applied at a set speed for desired film thickness ff. The coating was then cured at ambient or thermally until fully cured gg. The final cured product resulted in a highly lubricious coating Coating Metal Wire Substrate with Adhesion Promoter Preparation of Adhesion Promoter i. 100 mL ETOH (ETOH anhydrous) provided by Sigma ii. Add 5.0 gram water iii. Stir 10 minutes iv. Add 3.84 grams 3-aminopropyltriethoxysilane v. Mix 5 minutes x. Coating wire with adhesion promoter vi. Pour adhesion promoter into 100 mL burette (use shaker to mix)

vii. Place wire in graduated cylinder solution for 10 minutes viii. Take wire out of solution and place in 125 C oven for 10 minutes Polyurethane Tungsten Loaded Jacket hh. An aqueous and or solvent dispersion basecoat was prepared from 8.8 g of composition 7 AND 0.2 Easaqua XM-502 were then added to the formulation and stirred at 900 rpm for 15 minutes Basecoat was applied to the polyurethane jacketed wire, by dip coating, at a set speed for a desired film thickness ii. The basecoat was then cured either at ambient or thermally until no longer-tacky jj. An aqueous dispersion topcoat was prepared with crosslinker in the following order: (1) 0.005 grams Poly(ethylene oxide), 4-arm, amine terminated average $M_n$ ~10,000 was added to a one ounce bottle then (2) 0.01 grams '956 patent. To this crosslinker 11.576 grams of modified hyaluronan top coat formulated resin was added and crosslinker was stirred at 1800 rpm for 5 minutes kk. Topcoat was then applied at a set speed for desired film thickness ll. The coating was then cured at ambient or thermally until fully cured y. The final cured product resulted in a highly lubricious and durable coating Coating Example Composition 9

Materials were then applied to substrates noted below in the following fashion:

Coating Polyurethane Tungsten Loaded Jacket mm. An aqueous and or solvent dispersion basecoat was prepared from 8.8 g of composition 9 AND 0.02 Easaqua XM-502 were then added to the formulation and stirred at 900 rpm for 15 minutes Basecoat was applied to the polyurethane jacketed wire, by dip coating, at a set speed for a desired film thickness nn. The basecoat was then cured either at ambient or thermally until no longer-tacky oo. An aqueous dispersion topcoat was prepared with crosslinker in the following order: (1) 0.002 grams Poly(ethylene oxide), 4-arm, amine terminated average $M_n$ ~10,000 was added to a one ounce bottle then (2) 0.002 grams '956 patent. To this crosslinker 11.576 grams of modified hyaluronan top coat formulated resin was added and crosslinker was stirred at 1800 rpm for 5 minutes pp. Topcoat was then applied at a set speed for desired film thickness qq. The coating was then cured at ambient or thermally until fully cured rr. The final cured product resulted in a highly lubricious coating Coating Metal Wire Substrate with Adhesion Promoter Preparation of Adhesion Promoter i. 100 mL ETOH (ETOH anhydrous)

ii. Add 5.0 gram water iii. Stir 10 minutes iv. Add 3.84 grams 3-aminoethyltriethoxysilane (Provided by Gelest)

v. Mix 5 minutes z. Coating wire with adhesion promoter vi. Pour adhesion promoter into 100 mL burette (use shaker to mix)

vii. Place wire in graduated cylinder solution for 10 minutes viii. Take wire out of solution and place in 125 C oven for 10 minutes Polyurethane Tungsten Loaded Jacket ss. An aqueous and or solvent dispersion basecoat was prepared from 8.8 g of composition 9 AND 0.02 Easaqua XM-502 were then added to the formulation and stirred at 900 rpm for 15 minutes Basecoat was applied to the polyurethane jacketed wire, by dip coating, at a set speed for a desired film thickness tt. The basecoat was then cured either at ambient or thermally until no longer-tacky uu. An aqueous dispersion topcoat was prepared with crosslinker in the following order: (1) 0.002 grams Poly(ethylene oxide), 4-arm, amine terminated average $M_n$ ~10,000 was added to a one ounce bottle then (2) 0.002 grams '956 patent. To this crosslinker 11.576 grams of modified hyaluronan top coat formulated resin was added and crosslinker was stirred at 1800 rpm for 5 minutes vv. Topcoat was then applied at a set speed for desired film thickness ww. The coating was then cured at ambient or thermally until fully cured xx. The final cured product resulted in a highly lubricious and durable coating Composition 1 comprising epoxy urethane alkylene oxide reactive coating compositions of the structure of formula (I).

Composition 4 comprising epoxy urethane ester carboxylic acid alkylene oxide reactive coating compositions of the following structure (II), wherein the epoxy urethane ester carboxylic acid alkylene oxide reactive coating compositions are:

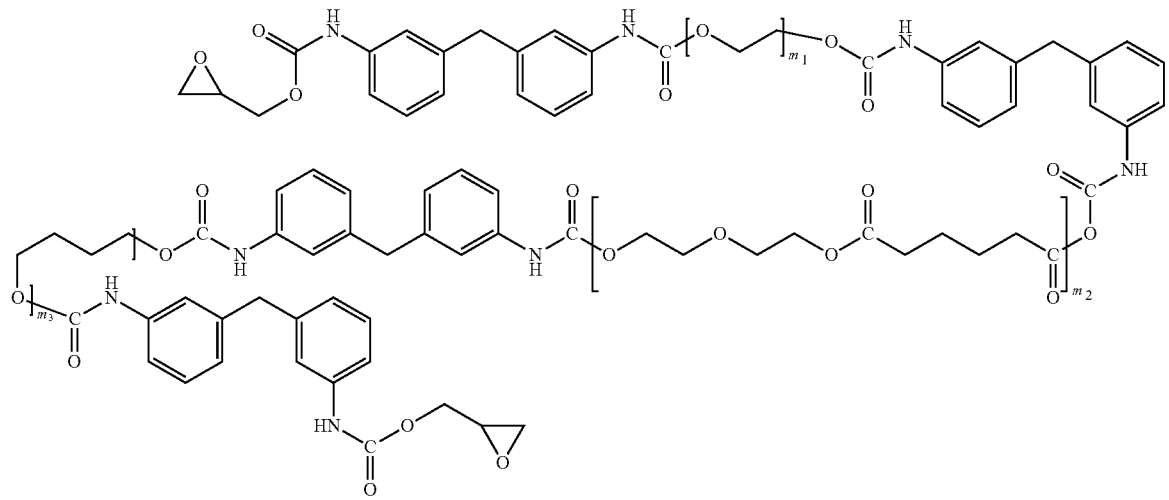

Composition 2 comprising epoxy urethane alkylene oxide reactive coating compositions of the structure of formula (I), wherein the epoxy urethane alkylene oxide reactive coating compositions are:
  (a) polyethylene oxide, with $m_1$ having an average molecular weight in the range of about 18,000 to about 2,000,000, wherein $m_1$=375 to about 41,667;
  (b) poly[di(ethylene glycol)adipate], with $m_2$ having an average molecular weight in the range of about 400 to about 10,000, wherein $m_2$=2 to about 50;
  (c) poly(tetrahydrofuran), with $m_3$ having an average molecular weight in the range of about 1,000 to about 4,000,000, wherein $m_3$=11 to about 46; and
  (d) glycidyl moieties are represented by the addition of glycidol.

Composition 3 comprising epoxy urethane ester carboxylic acid alkylene oxide reactive coating compositions of the following structure (II):

(a) polyethylene oxide, with $m_1$ having an average molecular weight in the range of about 18,000 to about 2,000,000, wherein $m_1$=375 to about 41,667;
  (b) poly[di(ethylene glycol)adipate], with $m_2$ having an average molecular weight in the range of about 400 to about 10,000, wherein $m_2$=2 to about 50;
  (c) poly(tetrahydrofuran), with $m_3$ having an average molecular weight in the range of about 1,000 to about 4,000,000, wherein $m_3$=11 to about 46;
  (d) acid moieties are represented by the addition of dimethylol propionic acid;
  (e) glycidyl moieties are represented by the addition of glycidol; and
  (f) excess isocyanate can react with dimethylol propionic acid to form an amide resulting in urea.

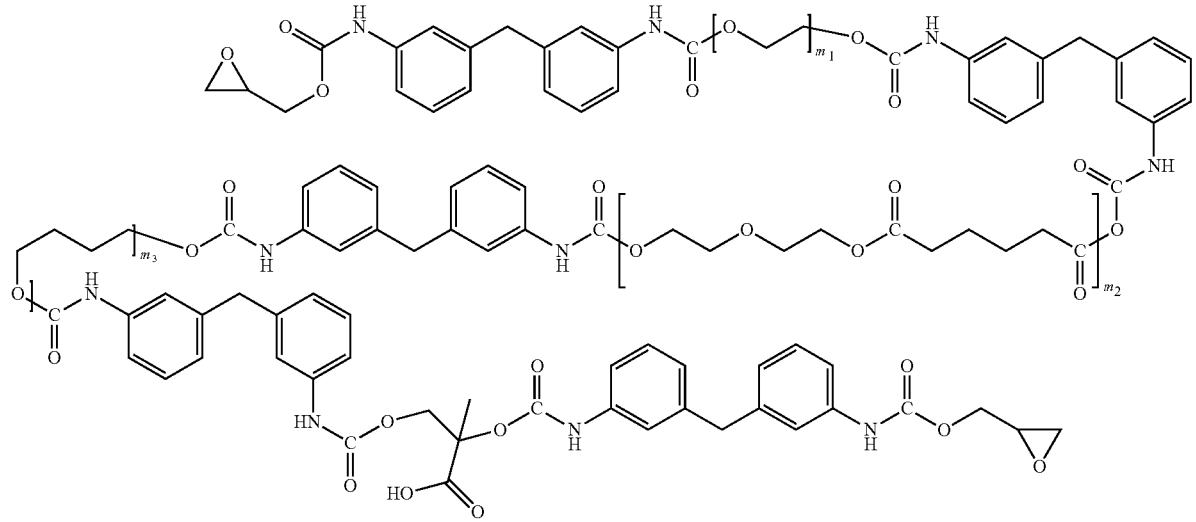

Composition 5 comprising epoxy urethane urea carboxylic acid alkylene oxide reactive coating compositions of the following structure (III):

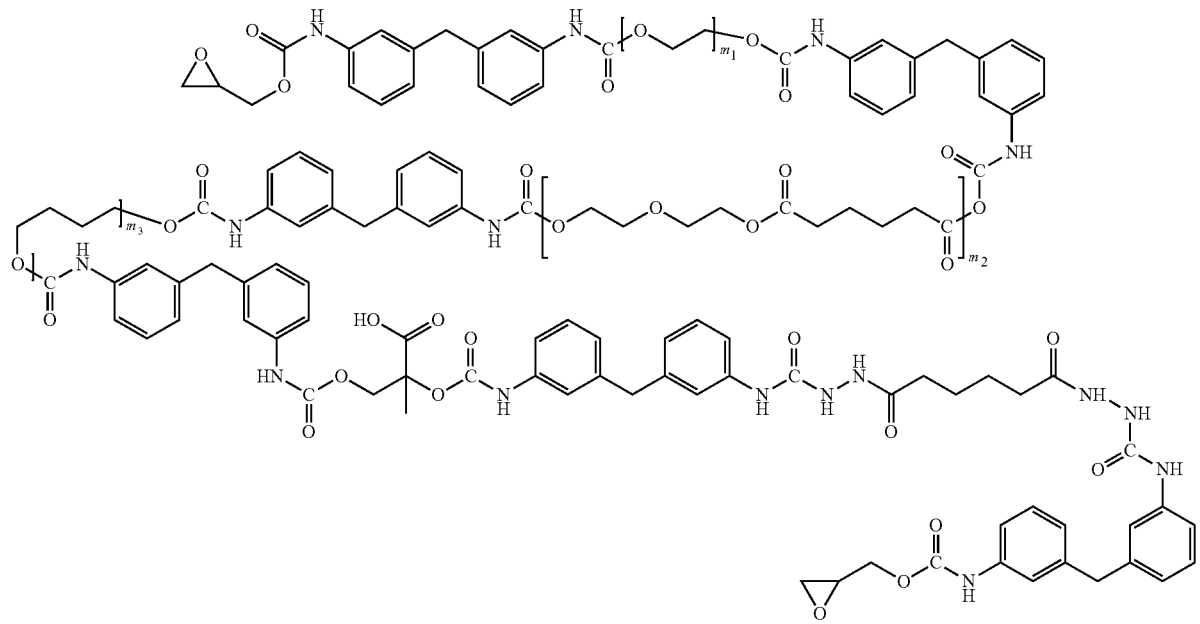

Composition 6 comprising epoxy urethane urea carboxylic acid alkylene oxide reactive coating compositions of the following structure (III), wherein the epoxy urethane urea carboxylic acid alkylene oxide reactive coating compositions are:
(a) polyethylene oxide, with $m_1$ having an average molecular weight in the range of about 18,000 to about 2,000,000, wherein $m_1=375$ to about 41,667;
(b) poly[di(ethylene glycol)adipate], with $m_2$ having an average molecular weight in the range of about 400 to about 10,000, wherein $m_2=2$ to about 50;
(c) poly(tetrahydrofuran), with $m_3$ having an average molecular weight in the range of about 1,000 to about 4,000,000, wherein $m_3=11$ to about 46;
(d) acid moieties are represented by the addition of dimethylol propionic acid;
(e) glycidyl moieties are represented by the addition of glycidol;
(f) urea moieties are represented by the addition of adipic acid dihydrazide; and
(g) excess isocyanate can react with dimethylol propionic acid to form an amide resulting in urea.

Composition 7 comprising epoxy urethane urea (based off water addition) carboxylic acid alkylene oxide reactive coating compositions of the following structure (IV):

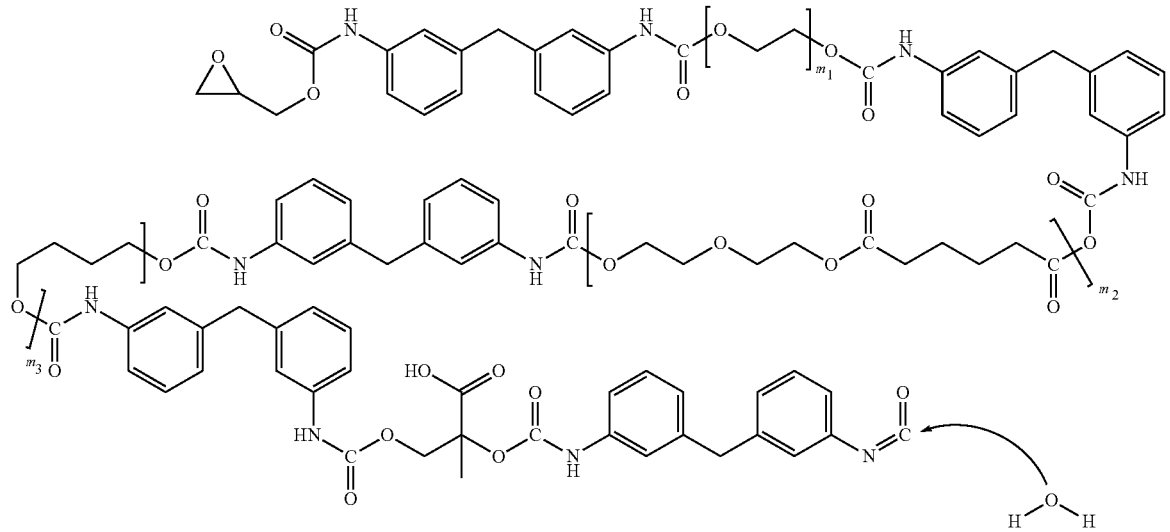

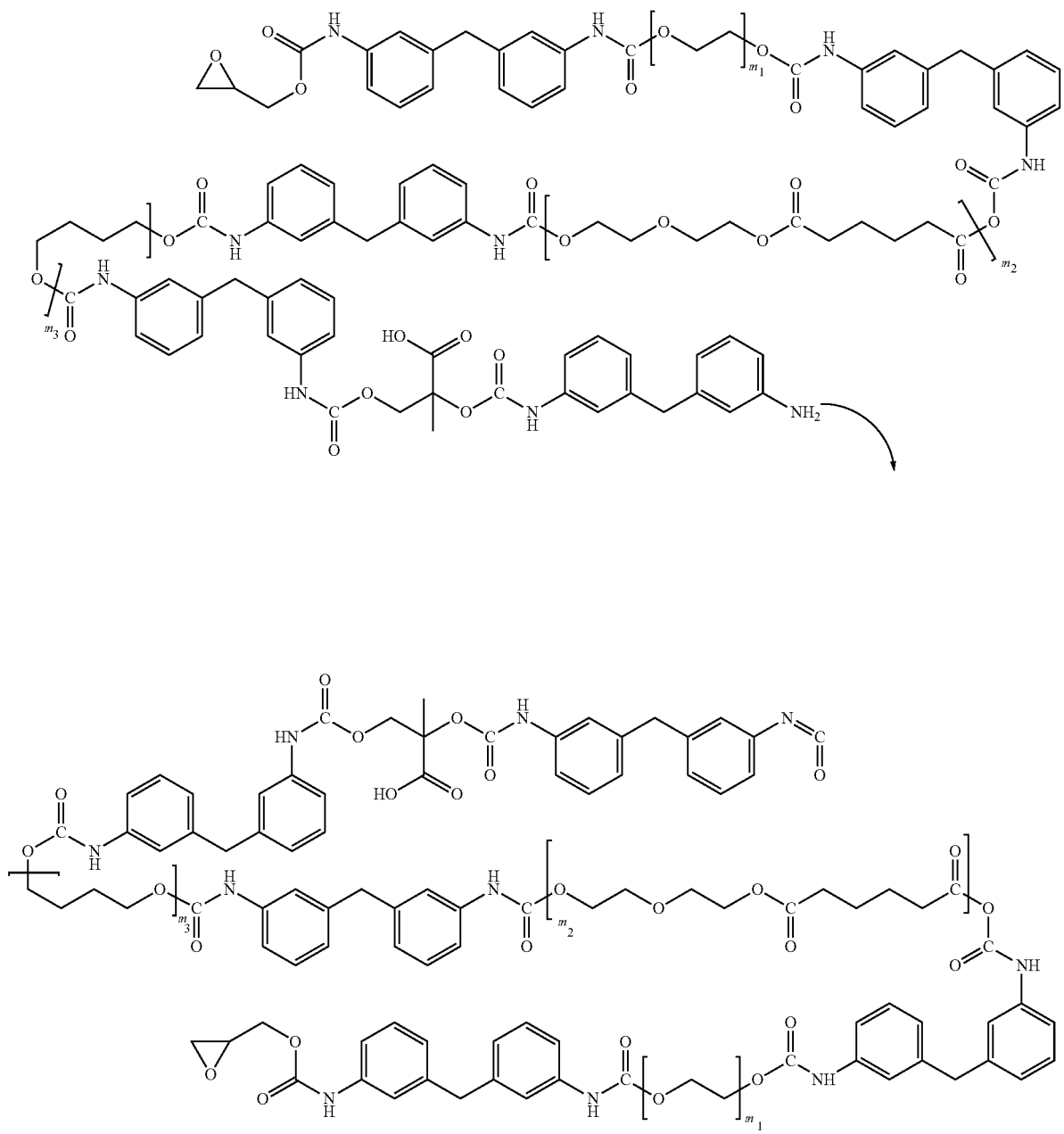

Composition 8 comprising epoxy urethane urea (based off water addition) carboxylic acid alkylene oxide reactive coating compositions of the following structure (IV), wherein the epoxy urethane urea carboxylic acid alkylene oxide reactive coating compositions are:
- (a) polyethylene oxide, with $m_1$ having an average molecular weight in the range of about 18,000 to about 2,000,000, wherein $m_1$=375 to about 41,667;
- (b) poly[di(ethylene glycol)adipate], with $m_2$ having an average molecular weight in the range of about 400 to about 10,000, wherein $m_2$=2 to about 50;
- (c) poly(tetrahydrofuran), with $m_3$ having an average molecular weight in the range of about 1,000 to about 4,000,000, wherein $m_3$=11 to about 46;
- (d) acid moieties are represented by the addition of dimethylol propionic acid;
- (e) glycidyl moieties are represented by the addition of glycidol; and
- (f) urea moieties are represented by the addition of reduced isocyanate system then adding water.

Composition 9 comprising epoxy urethane urea (based off excess isocyanate) carboxylic acid alkylene oxide reactive coating compositions of the following structure (V):

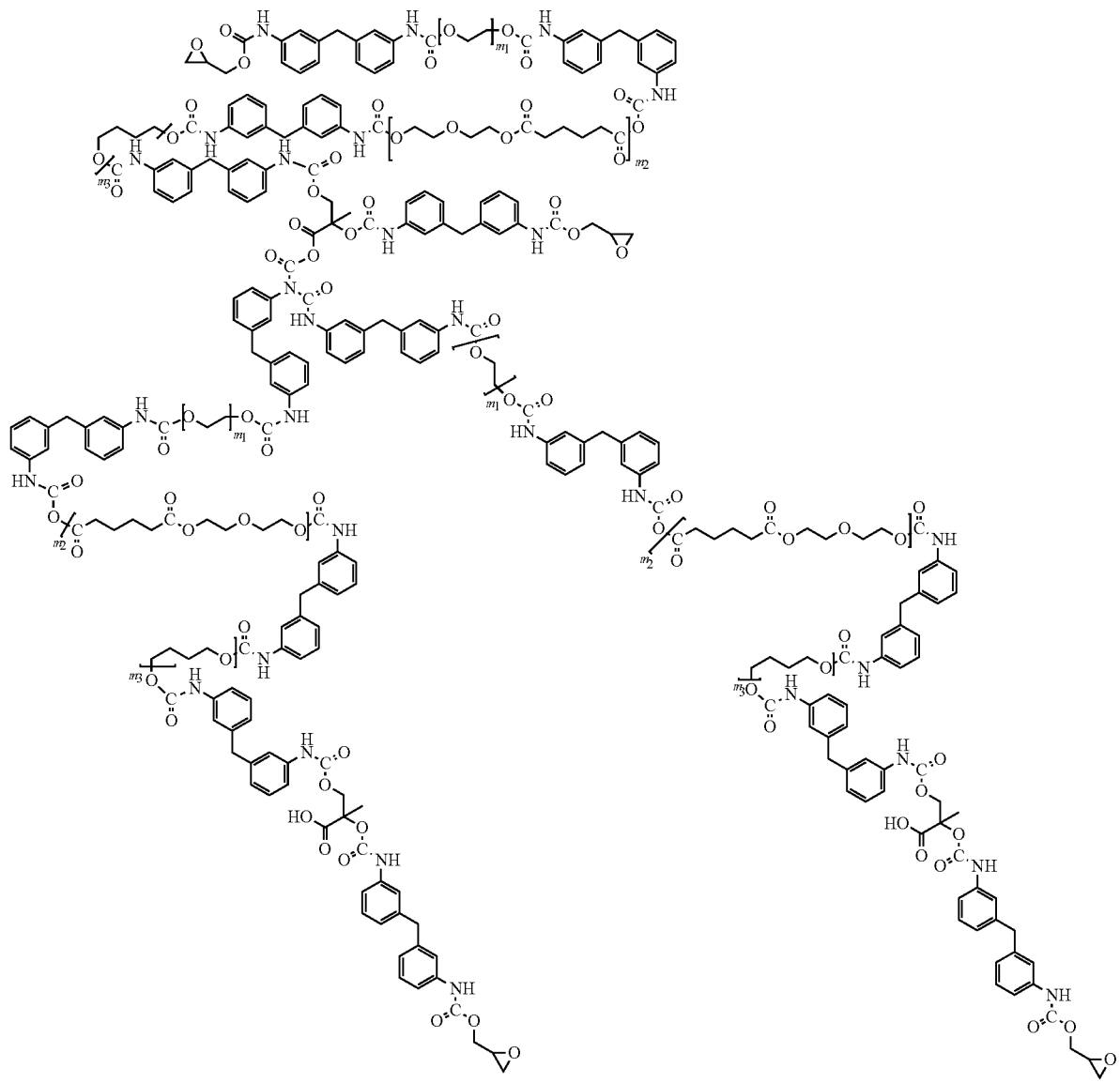

(V)

Composition 10 comprising epoxy urethane urea (based off excess isocyanate) carboxylic acid alkylene oxide reactive coating compositions of the following structure (V), wherein the epoxy urethane urea carboxylic acid alkylene oxide reactive coating compositions are:
- (a) polyethylene oxide, with $m_1$ having an average molecular weight in the range of about 18,000 to about 2,000,000, wherein $m_1$=375 to about 41,667;
- (b) poly[di(ethylene glycol)adipate], with $m_2$ having an average molecular weight in the range of about 400 to about 10,000, wherein $m_2$=2 to about 50;
- (c) polytrimethylene ether glycol, with $m_3$ having an average molecular weight in the range of about 1,000 to about 4,000,000, wherein $m_3$=11 to about 46;
- (d) acid moieties are represented by the addition of dimethylol propionic acid;
- (e) glycidyl moieties are represented by the addition of glycidol; and
- (f) urea moieties are represented by the addition of excess isocyanate, in the system, to adipic acid dihydrazide.

Composition 11 being an aqueous soluble or solvent soluble or mixture comprising formulas (I)(a)-(d), (II)(a)-(f), (III)(a)-(g), (IV)(a)-(f), and (V)(a)-(f).

Composition 12 being a composition of formulas (I)(a)-(d), (II)(a)-(f), (III)(a)-(g), (IV)(a)-(f), and (V)(a)-(f), where an aqueous soluble solvent is water and solvent soluble solvents are aprotic.

Composition 13 being a composition of formulas (I)(a)-(d), (II)(a)-(f), (III)(a)-(g), (IV)(a)-(f), and (V)(a)-(f), where an aqueous soluble solvent is water and solvent soluble solvents are aprotic, and where the aprotic solvents are NMP, DMSO or DMF.

Composition 14 being a composition of formulas (I)(a)-(d), (II)(a)-(f), (III)(a)-(g), (IV)(a)-(f), and (V)(a)-(f), where the solvent can be a polar non-reactive solvent.

Composition 15 being a composition of formulas (I)(a)-(d), (II)(a)-(f), (III)(a)-(g), (IV)(a)-(f), and (V)(a)-(f), where the solvent can be a polar non-reactive solvent, and where the solvent can be PMA, Acetone or MEK.

Composition 16 being a composition of formulas (I)(a)-(d), (II)(a)-(f), (III)(a)-(g), (IV)(a)-(f), and (V)(a)-(f) where a chain extender is added.

Composition 17 being a composition of formulas (I)(a)-(d), (II)(a)-(f), (III)(a)-(g), (IV)(a)-(f), and (V)(a)-(f) where the curing agent is a self-crosslinking reaction via homopolymerization or polyetherification.

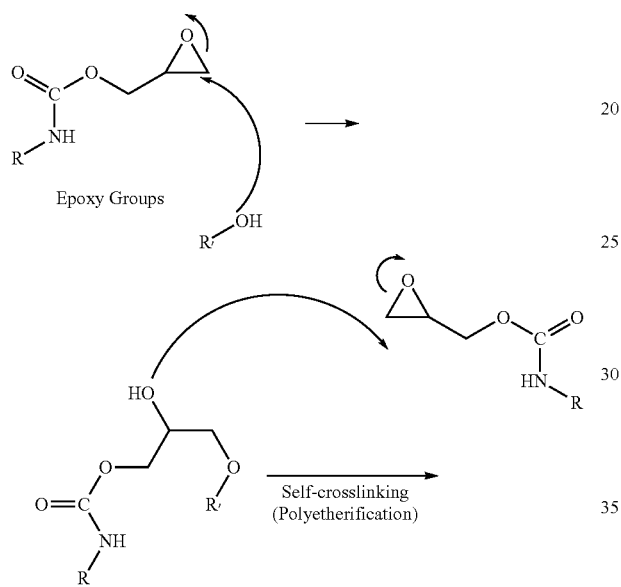

Composition 18 being a composition of formulas (I)(a)-(d), (II)(a)-(f), (III)(a)-(g), (IV)(a)-(f), and (V)(a)-(f) where the curing agent is a self-crosslinking reaction via homopolymerization or polyetherification, and where kinetics of the reaction are improved with temperature Composition 19 being a composition comprising a mixture compounds with structures (I), (II), (III), (IV) and (V).

Composition 20 being a coating composition of formulas (I)(a)-(d), (II)(a)-(f), (III)(a)-(g), (IV)(a)-(f), and (V)(a)-(f) further comprising a curing agent.

Composition 21 being a coating composition of formulas (II)(a)-(f), (III)(a)-(g), (IV)(a)-(f), and (V)(a)-(f), wherein the curing agent is an aziridine curing agent.

Composition 22 being a composition of formulas (II)(a)-(f), (II)(a)-(g), (IV)(a)-(f), and (V)(a)-(f), wherein the curing agent is an aziridine curing agent, and where basecoat carboxylic acid groups can react with polyaziridine (PZ-28 or PZ-33):

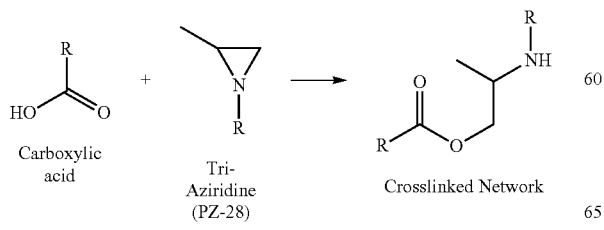

(a) polyaziridine PZ-28 reaction with basecoat (composition of formulas (II)(a)-(f), (III)(a)-(g), (IV)(a)-(f), and (V)(a)-(f)), wherein the curing agent is an aziridine curing agent, and where basecoat carboxylic acid groups can react with polyaziridine (PZ-28 or PZ-33);

(b) polyaziridine PZ-28 or PZ-33, added to basecoat (composition of formulas (II)(a)-(f), (III)(a)-(g), (IV)(a)-(f), and (V)(a)-(f)), reacts with carboxylic acid in modified Hyaluronic Acid topcoat:

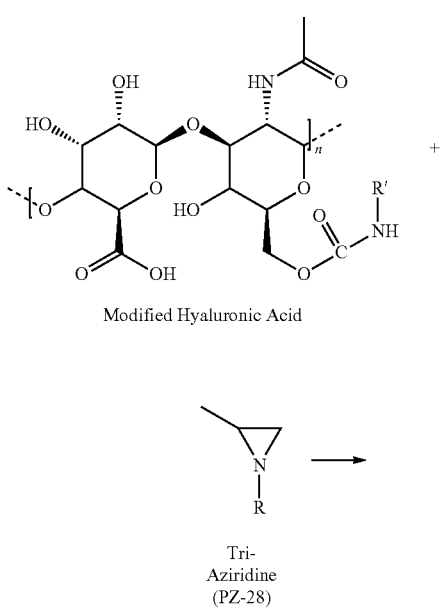

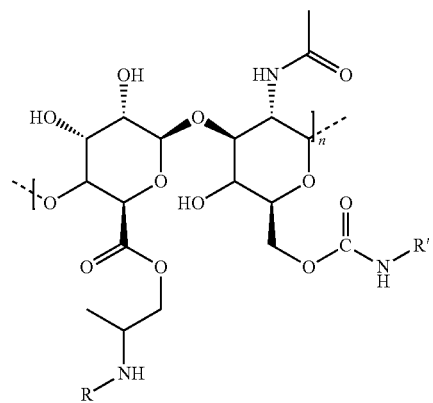

(c) polyaziridine PZ-28 or PZ-33 (claim 22 (composition of formulas (II)(a)-(f), (III)(a)-(g), (IV)(a)-(f), and (V)(a)-(f), wherein the curing agent is an aziridine curing agent, and where basecoat carboxylic acid groups can react with polyaziridine (PZ-28 or PZ-33)), connecting basecoat to modified hyaluronic acid topcoat:

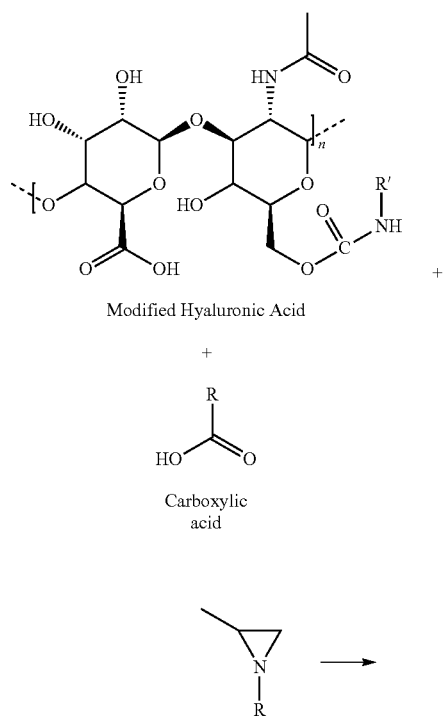

Modified Hyaluronic Acid

+

Carboxylic acid

Tri-Aziridine (PZ-28)

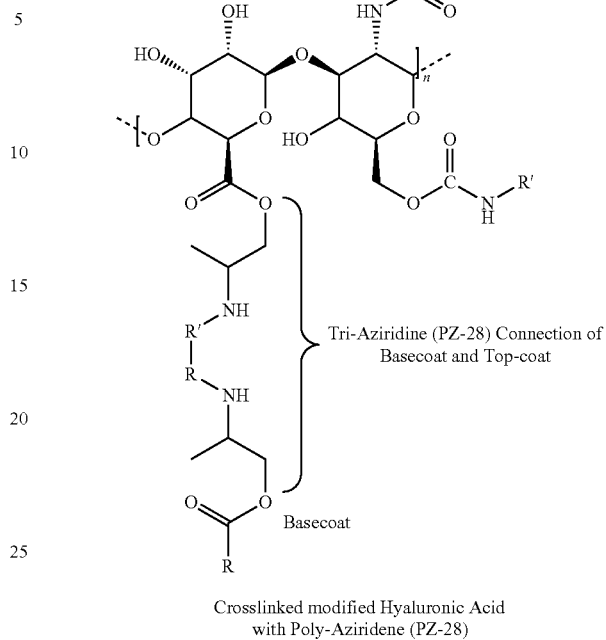

Modified Topcoat

Tri-Aziridine (PZ-28) Connection of Basecoat and Top-coat

Basecoat

Crosslinked modified Hyaluronic Acid with Poly-Aziridene (PZ-28)

Composition 23 being a composition of formulas (I)(a)-(d), (II)(a)-(f), (III)(a)-(g), (IV)(a)-(f), and (V)(a)-(f), where epoxy groups can react with an amine cross-linking agents (Figure below).

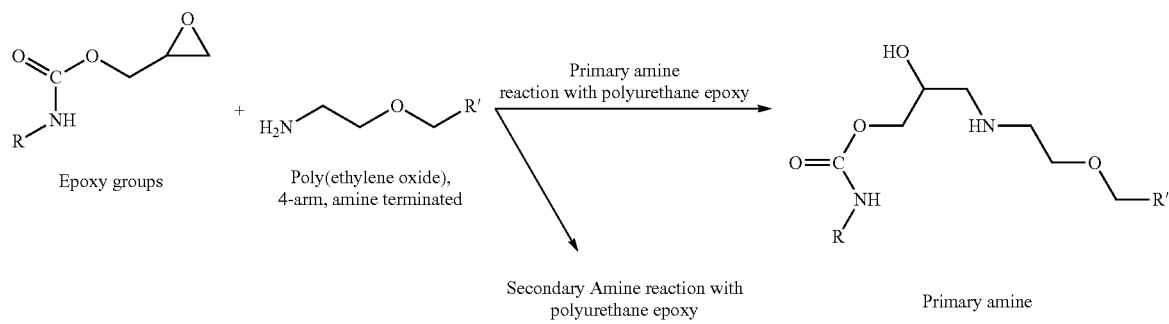

Epoxy groups + Poly(ethylene oxide), 4-arm, amine terminated → Primary amine reaction with polyurethane epoxy → Primary amine Secondary Amine reaction with polyurethane epoxy

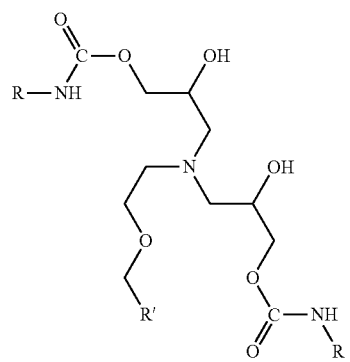

Composition 24 being the coating composition of formulas (I)(a)-(d), (II)(a)-(f), (III)(a)-(g), (IV)(a)-(f), and (V)(a)-(f), where epoxy groups can react with an amine cross-linking agents (Figure below), wherein the amine curing agent is poly(ethylene oxide), 4-arm, amine terminated.

Composition 25 being basecoat epoxy groups that can react with poly(ethylene oxide), 4-arm, amine terminated found in topcoat.
  (a) The '956 patent epoxy groups can react with poly(ethylene oxide), 4-arm, amine terminated and poly(ethylene oxide), 4-arm, amine terminated can react with basecoat to increase adhesive strength.

Composition 26 being a composition of formulas (I)(a)-(d), (II)(a)-(f), (III)(a)-(g), (IV)(a)-(f), and (V)(a)-(f), where open hydroxyl groups from epoxy group ring opening can react with isocyanate cross-linking agents (Figure below).

Composition 27 being the coating composition of formulas (I)(a)-(d), (II)(a)-(f), (III)(a)-(g), (IV)(a)-(f), and (V)(a)-(f), where open hydroxyl groups from epoxy group ring opening can react with isocyanate cross-linking agents (Figure below), wherein the isocyanate curing agent is Easaqua XM-502:

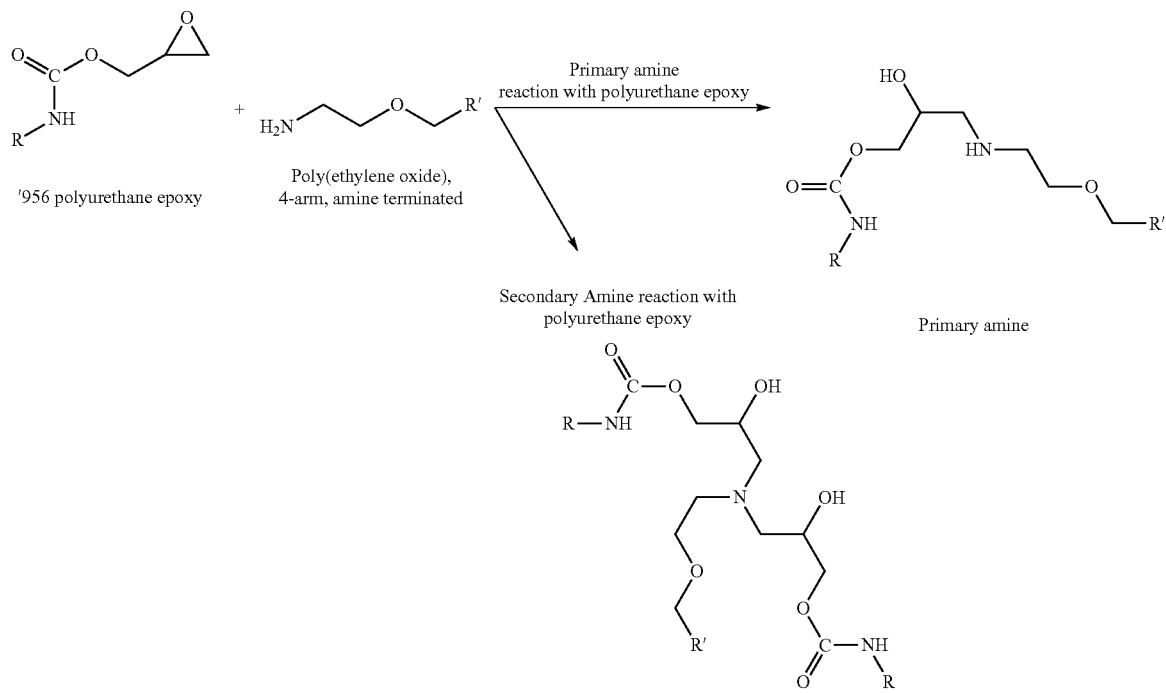

(a) Easaqua XM-502 added to the basecoat reacts with basecoat carboxylic acid:

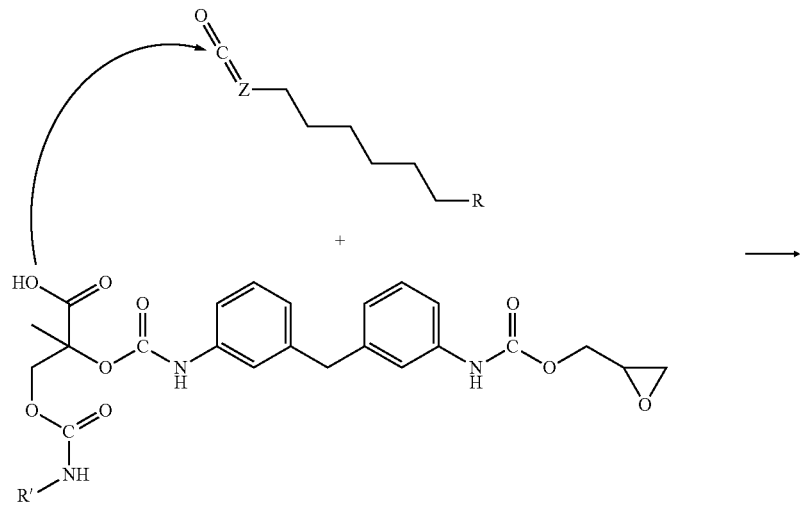

-continued
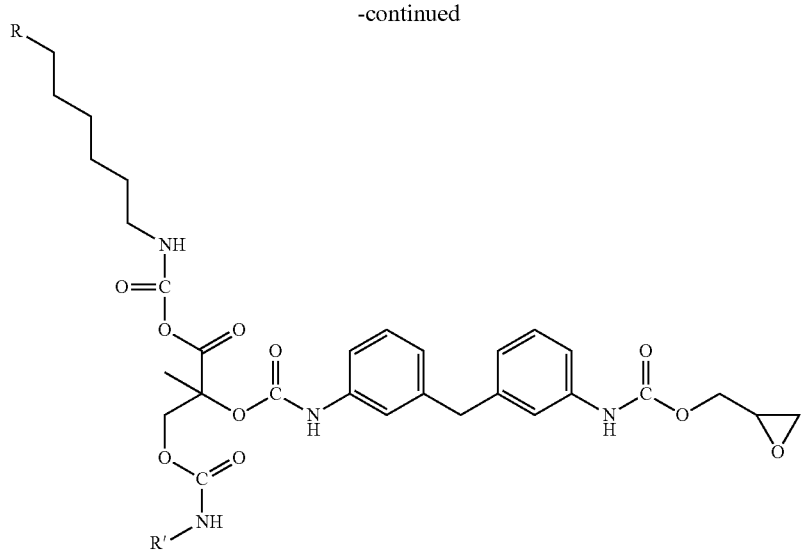
(b) Easaqua XM-502 added to the basecoat reacts with Poly(ethylene oxide), 4-arm, amine added as a crosslinker to the top-coat:
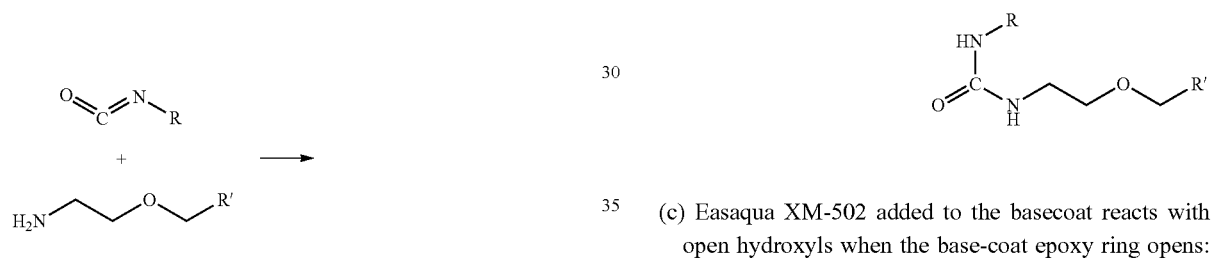
-continued
(c) Easaqua XM-502 added to the basecoat reacts with open hydroxyls when the base-coat epoxy ring opens:
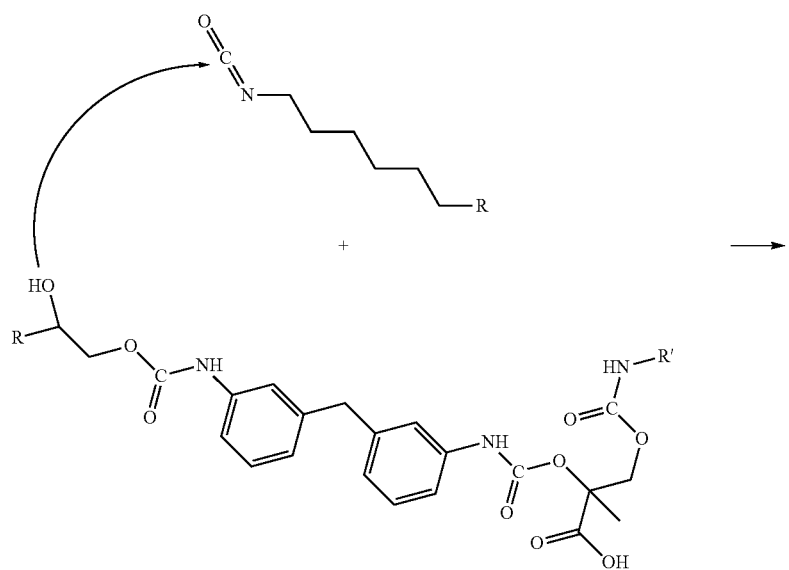

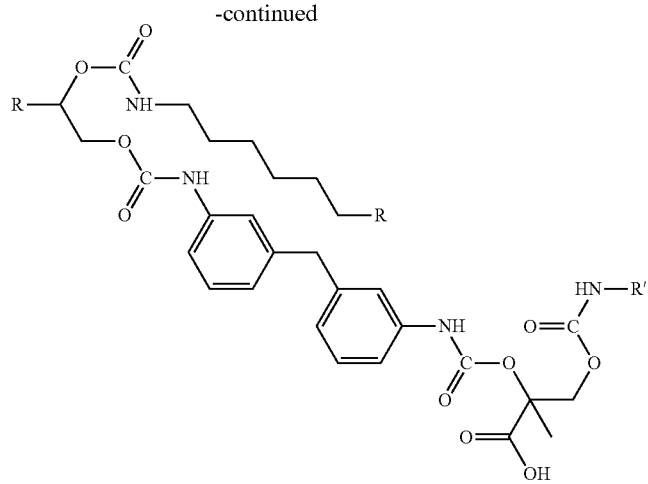
(d) Easaqua XM-502 added to the basecoat reacts with open hydroxyls when the '956 patent ring opens:
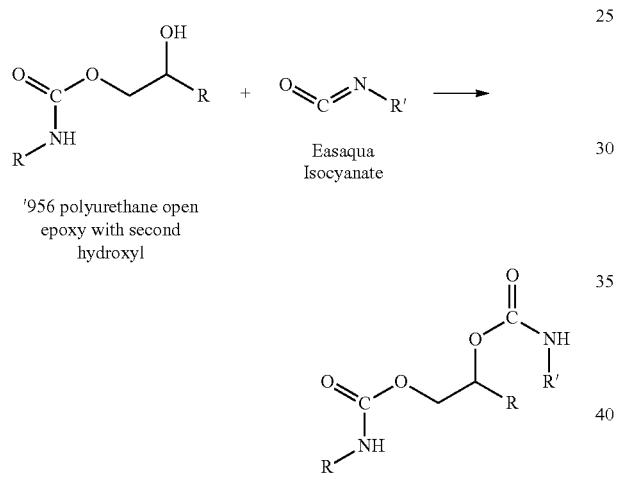
(e) Easaqua XM-502 reacts with hydroxyl groups found in Hyaluronic acid:
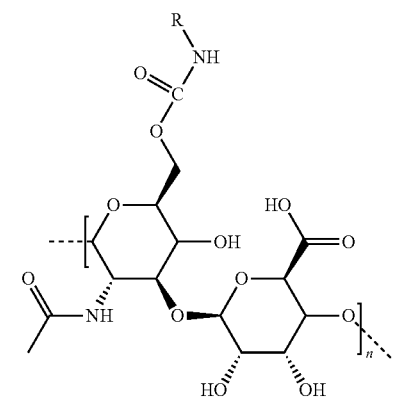
(f) Easaqua XM-502 reacts with carboxylic groups found in Hyaluronic acid:
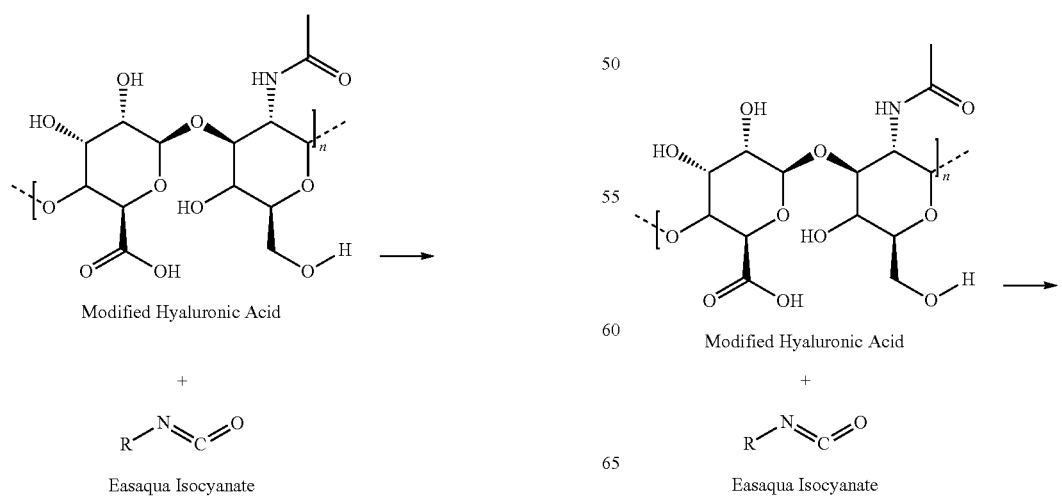

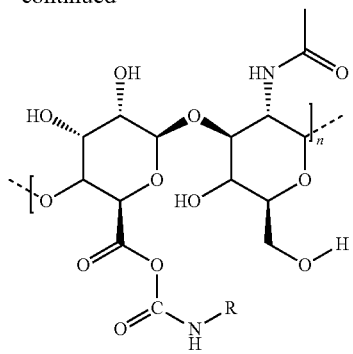

Composition 28 being of formulas (I)(a)-(d), (II)(a)-(f), (III)(a)-(g), (IV)(a)-(f), and (V)(a)-(f), where epoxy groups can be end-capped with mono-functional amines:

Composition 29 being of formulas (II)(a)-(f), (III)(a)-(g), (IV)(a)-(f), and (V)(a)-(f) where adding dimethylpropionic acid (DMPA) can lead to cross-linking sites and also help with water dispersion by forming water reducible epoxy polyurethanes.

Composition 30 being of formulas (II)(a)-(f), (III)(a)-(g), (IV)(a)-(f), and (V)(a)-(f) where adding dimethylpropionic acid (DMPA) can lead to cross-linking sites and also help with water dispersion by forming water reducible epoxy polyurethanes, where acid groups of DMPA can be neutralized with an amine then dispersed in water.

Composition 31 being of formulas (I)(a)-(d), (II)(a)-(f), (III)(a)-(g), (IV)(a)-(f), and (V)(a)-(f), where linear polyurethane epoxy polymers are elastomeric and can elongate.

Composition 32 being of formulas (I)(a)-(d), (II)(a)-(f), (III)(a)-(g), (IV)(a)-(f), and (V)(a)-(f), where hydration forms a hydrogel via physical cross-links; or, slight cross-linking can cause a swelling (hydrogel formation) or plasticization effect resulting in a lubricious polyurethane end capped glycidyl based polymers.

Composition 33 being an epoxy termination of formulas (I)(a)-(d), (II)(a)-(f), (III)(a)-(g), (IV)(a)-(f), and (V)(a)-(f) that may crosslink by amines, amides, carboxylic acids and hydroxyl functionality.

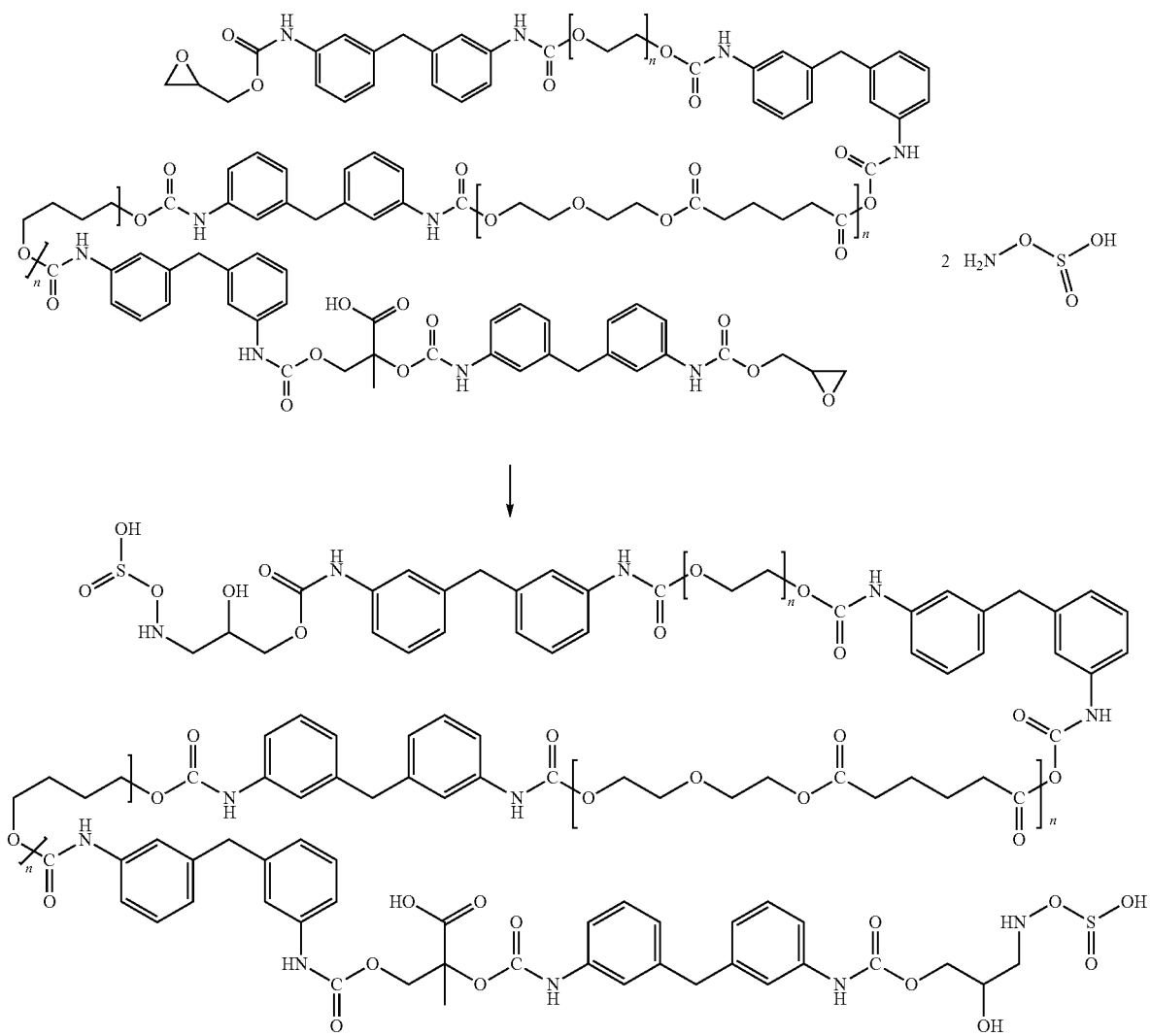

Composition 34 being a coating composition of formulas (I)(a)-(d), (II)(a)-(f), (III)(a)-(g), (IV)(a)-(f), and (V)(a)-(f) that may crosslink by amines, amides, carboxylic acids and hydroxyl functionality, where open hydroxyl functionality, from epoxy ring group opening, can undergo hydroxyl reactions.

Composition 35 being of formulas (I)(a)-(d), (II)(a)-(f), (III)(a)-(g), (IV)(a)-(f), and (V)(a)-(f) that are affected by diisocyanate type.

Composition 36 being a coating composition of formulas (I)(a)-(d), (II)(a)-(f), (III)(a)-(g), (IV)(a)-(f), and (V)(a)-(f), wherein the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 4,4'methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, with combinations and isomers thereof.

Composition 37 being a composition of formulas (I)(a)-(d), (II)(a)-(f), (III)(a)-(g), (IV)(a)-(f), and (V)(a)-(f), that are reacted with polyol cross-linkers.

Composition 38 being a composition of formulas (I)(a)-(d), (II)(a)-(f), (III)(a)-(g), (IV)(a)-(f), and (V)(a)-(f), that are reacted with amine cross-linkers.

Composition 39 being a composition of formulas (III)(a)-(g), (IV)(a)-(f), and (V)(a)-(f), where a diol or amine chain extender is added.

Composition 40 being a composition of formulas (I)(a)-(d), (II)(a)-(f), (III)(a)-(g), (IV)(a)-(f), and (V)(a)-(f), wherein the diol chain extender is selected from hydroquinone-bis-(hydroxymethyl)ether, ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis(hydroxyethylene) terephthalate, hydroquinone bis(2-hydroxyethyl)ether, and combinations and isomers thereof.

Composition 41 being a coating composition of formulas (I)(a)-(d), (II)(a)-(f), (III)(a)-(g), (IV)(a)-(f), and (V)(a)-(f) further comprising a curing agent, wherein the amine chain extender is selected from 2,4 and 2,6 diethyltoluene diamine, methylene-bis-orthochloroaniline, unilink (UOP LLC), 4,4'-methylene-bis(3-chloro-2,6-diethylaniline), 1,2-ethylenediamine, 1,6-hexanediamine, 1,2-propanediamine, 4,4'-methylene-bis(3-chloroaniline), dimethylthiotoluenediamine, 4,4'diaminodiphenylmethane, 1,3-diaminobenzene, 1,4-diaminobenzene, 3,3'dimethoxy-4,4'-diaminobiphenyl, 3,3'-dichloro-4,4'-diamino biphenyl, and combinations and isomers thereof.

Composition 42 being the coating composition of formulas (I)(a)-(d), (II)(a)-(f), (III)(a)-(g), (IV)(a)-(f), and (V)(a)-(f), wherein the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 4,4'methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, with combinations and isomers thereof, wherein isocyanate selection, and isomers, affect physical crosslinks of the final epoxy terminated polyurethane polymer.

Composition 43 being a coating composition of formulas (I)(a)-(d), (II)(a)-(f), (III)(a)-(g), (IV)(a)-(f), and (V)(a)-(f), wherein the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 4,4'methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, with combinations and isomers thereof, wherein isocyanate selection, and isomers, affect physical crosslinks of the final epoxy terminated polyurethane polymer, where 4-4'MDI terminated epoxy polyurethanes provides excellent hard block domains due to linearity and aromatic groups.

Composition 44 being a coating composition of formulas (I)(a)-(d), (II)(a)-(f), (III)(a)-(g), (IV)(a)-(f), and (V)(a)-(f), wherein the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 4,4'methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, with combinations and isomers thereof, wherein isocyanate selection, and isomers, affect physical crosslinks of the final epoxy terminated polyurethane polymer, where isocyanate isomers of 2-4-TDI and 2,6-TDI react differently and impart different resin properties of the terminated polyurethane epoxy.

Composition 45 being a coating composition of formulas (I)(a)-(d), (II)(a)-(f), (III)(a)-(g), (IV)(a)-(f), and (V)(a)-(f), wherein the diisocyanate is selected from 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 4,4'methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, isophorone diisocyanate, with combinations and isomers thereof, where isocyanate cross-linkers can react with open hydroxyl functional groups (epoxy ring opening) to improve durability.

Composition 46 being of formulas (I)(a)-(d), (II)(a)-(f), (III)(a)-(g), (IV)(a)-(f), and (V)(a)-(f), where pre-polymers can be made first then terminated with glycidol.

Composition 47 being of formulas (I)(a)-(d), (II)(a)-(f), (III)(a)-(g), (IV)(a)-(f), and (V)(a)-(f), where a one shot synthesis can be used with all monomers, including glycidol, are added all at once.

Composition 48 being of formulas (I)(a)-(d), (II)(a)-(f), (III)(a)-(g), (IV)(a)-(f), and (V)(a)-(f), where a one shot synthesis can be used with all monomers, including glycidol, are added all at once, where monomers can be added to the reaction non-sequentially at any time during the reaction.

What is claimed is:

1. An epoxy urethane alkylene oxide coating comprising a reaction product of the following reactants:
   a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
b) a poly(ethylene oxide) segment having a number average molecular weight in the range of about 18,000 to about 2,000,000;
c) a poly[di(ethylene glycol) adipate] segment;
d) a poly(tetrahydrofuran) segment; and
e) glycidol.

2. The coating of claim 1, wherein the reaction product further comprises glycidyl moieties as a reacted product of the glycidol.

3. The coating of claim 1, wherein the poly[di(ethylene glycol) adipate] segment has a number average molecular weight in the range of about 400 to about 10,000.

4. The coating of claim 1, wherein the reactants further comprise dimethylol propionic acid.

5. The coating of claim 4, wherein the reaction product further comprises:
a) acid moieties that result from the dimethylol propionic acid;
b) glycidyl moieties as a reacted product of the glycidol; and
c) wherein the diisocyanate is 4,4'-methylene diphenyl diisocyanate.

6. The coating of claim 5, wherein the reaction product further comprises an amide moiety as the reacted product of excess 4,4'-methylene diphenyl diisocyanate and the dimethylol propionic acid.

7. The coating of claim 6, wherein the reaction product further comprises urea moieties.

8. The coating of claim 4, wherein the reactants further comprise adipic acid dihydrazide.

9. The coating of claim 4, wherein the reactants further comprise water.

10. The coating of claim 9, wherein the reaction product further comprises:
a) acid moieties that result from the dimethylol propionic acid;
b) glycidyl moieties as a reacted product of the glycidol; and
c) urea moieties that result from reaction of the diisocyanate and adipic acid dihydrazide.

11. The coating of claim 9, wherein the reaction product further comprises:
a) acid moieties that result from the dimethylol propionic acid;
b) glycidyl moieties as a reacted product of the glycidol; and
c) wherein the diisocyanate is 4,4'-methylene diphenyl diisocynate.

12. The coating of claim 11, wherein the reaction product further comprises urea moieties that result from reaction of the diisocyanate and water.

13. An epoxy urethane alkylene oxide coating comprising a reaction product consisting essentially of the following reactants:
a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
b) a poly(ethylene oxide) segment having a number average molecular weight in the range of about 18,000 to about 2,000,000;
c) a poly[di(ethylene glycol) adipate] segment;
d) a poly(tetrahydrofuran) segment; and
e) glycidol.

14. The coating of claim 13, wherein the poly[di(ethylene glycol) adipate] segment has an number average molecular weight in the range of about 400 to about 10,000.

15. An epoxy urethane ester carboxylic acid alkylene oxide coating comprising a reaction product consisting essentially of the following reactants:
a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
b) a poly(ethylene oxide) segment having a number average molecular weight in the range of about 18,000 to about 2,000,000;
c) a poly[di(ethylene glycol) adipate] segment;
d) a poly(tetrahydrofuran) segment;
e) dimethylol propionic acid; and
f) glycidol.

16. An epoxy urethane urea carboxylic acid alkylene oxide coating comprising a reaction product consisting essentially of the following reactants:
a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, napthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
b) a poly(ethylene oxide) segment having a number average molecular weight in the range of about 18,000 to about 2,000,000;
c) a poly[di(ethylene glycol) adipate] segment;
d) a poly(tetrahydrofuran) segment;
e) dimethylol propionic acid;
f) adipic acid dihydrazide; and
g) glycidol.

17. A terminal oxirane polyurethane urea chain extender/water excess coating comprising a reaction product consisting essentially of the following reactants:
a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
b) a poly(ethylene oxide) segment having a number average molecular weight in the range of about 18,000 to about 2,000,000;
c) a poly[di(ethylene glycol) adipate] segment;

d) a poly(tetrahydrofuran) segment;
e) dimethylol propionic acid;
f) water; and
g) glycidol.

18. An epoxy urethane alkylene oxide coating comprising a reaction product consisting essentially of the following reactants:
   a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
   b) a poly(ethylene oxide) segment having a number average molecular weight in the range of about 18,000 to about 2,000,000;
   c) a poly[di(ethylene glycol) adipate] segment;
   d) a poly(tetrahydrofuran) segment;
   e) glycidol, and
   f) glycidyl moieties as a reacted product of the glycidol.

19. An epoxy urethane ester carboxylic acid alkylene oxide coating comprising a reaction product consisting essentially of the following reactants:
   a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1, 4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
   b) a poly(ethylene oxide) segment having a number average molecular weight in the range of about 18,000 to about 2,000,000;
   c) a poly[di(ethylene glycol) adipate] segment;
   d) a poly(tetrahydrofuran) segment;
   e) dimethylol propionic acid; and
   f) glycidol,
   g) wherein the reaction product further includes:
      i) acid moeities that result from the dimethylol propionic acid;
      ii) urea moieties; and
      iii) glycidyl moieties as a reacted product of the glycidol.

20. An epoxy urethane urea carboxylic acid alkylene oxide coating comprising a reaction product consisting essentially of the following reactants:
   a) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
   b) a poly(ethylene oxide) segment having a number average molecular weight in the range of about 18,000 to about 2,000,000;
   c) a poly[di(ethylene glycol) adipate] segment;
   d) a poly(tetrahydrofuran) segment;
   e) dimethylol propionic acid;
   f) adipic acid dihydrazide; and
   g) glycidol,
   h) wherein the reaction product further includes:
      i) acid moeities that result from the dimethylol propionic acid;
      ii) urea moieties; and
      iii) glycidyl moieties as a reacted product of the glycidol.

21. A terminal oxirane polyurethane urea chain extender/water excess coating comprising a reaction product consisting essentially of the following reactants:
   a) water;
   b) a diisocyanate selected from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
   c) a poly(ethylene oxide) segment having a number average molecular weight in the range of about 18,000 to about 2,000,000;
   d) a poly[di(ethylene glycol) adipate] segment;
   e) a poly(tetrahydrofuran) segment;
   f) dimethylol propionic acid;
   g) glycidol,
   h) wherein the reaction product further includes:
      i) acid moeities that result from the dimethylol propionic acid;
      ii) urea moieties; and
      iii) glycidyl moieties as a reacted product of the glycidol.

22. An epoxy urethane alkylene oxide coating comprising a reaction product of the following reactants:
   a) a diisocyanate from the group consisting of 2,4-toluene diisocyanate, 2,6-toluene diisocyanate, 4,4'-dicyclohexylmethane diisocyanate, 3,3'-dimethyl-4,4'-biphenyl diisocyanate, 4,4'-methylene diphenyl diisocyanate, polymeric MDI, naphthalene diisocyanate, 4,4'-diisocyanatodicyclohexylmethane, 1,4-benzene diisocyanate, trans-cyclohexane-1,4-diisocyanate, 1,5-naphthalene diisocyanate, 1,6-hexamethylene diisocyanate, 4,6-xylene diisocyanate, and isophorone diisocyanate, with combinations and isomers thereof;
   b) a dimethylol propionic acid;
   c) a poly[di(ethylene glycol) adipate] segment;
   d) a poly(tetrahydrofuran) segment; and
   e) glycidol.

23. The coating of claim 22, wherein the reaction product further comprises:
   a) acid moieties that result from the dimethylol propionic acid;
   b) glycidyl moieties as a reacted product of the glycidol; and
   c) wherein the diisocyanate is 4,4'-methylene diphenyl diisocyanate.

24. The coating of claim 23, wherein the reaction product further comprises an amide moiety as the reacted product of excess 4,4'-methylene diphenyl diisocyanate and the dimethylol propionic acid.

25. The coating of claim 24 wherein the reaction product further comprises urea moeities.

26. The coating of claim 22, wherein the reactants further comprise adipic acid dihydrazide.

27. The coating of claim 26, wherein the reactants further comprise water.

28. The coating of claim 27, wherein the reaction product further comprises:
   a) acid moieties that result from the dimethylol propionic acid;
   b) glycidyl moieties as a reacted product of the glycidol; and
   c) urea moieties that result from reaction of adipic acid dihydrazide and the diisocyanate.

29. The coating of claim 27, wherein the reaction product further comprises:
   a) acid moieties that result from the dimethylol propionic acid;
   b) glycidyl moieties as a reacted product of the glycidol; and
   c) wherein the diisocyanate is 4,4'-methylene diphenyl diisocyanate.

30. The coating of claim 29 wherein the reaction product further comprises urea moieties that result from reaction of the diisocyanate and water.

\* \* \* \* \*

UNITED STATES PATENT AND TRADEMARK OFFICE
CERTIFICATE OF CORRECTION

PATENT NO. : 9,714,361 B2  
APPLICATION NO. : 15/224952  
DATED : July 25, 2017  
INVENTOR(S) : Peter Anthony Edwards Page 1 of 1

It is certified that error appears in the above-identified patent and that said Letters Patent is hereby corrected as shown below:

On the Title Page

Column 1, (73) Line 1 Assignee delete "Manfacturing" and insert --Manufacturing--

In the Claims

Column 58, Line 8 (Claim 14, Line 2) delete "an" and insert --a--

Column 59, Line 22 (Claim 18, Line 18) after "segment;" insert --and--

Column 59, Line 23 (Claim 18, Line 19) after the word "glycidol" delete "; and" and insert a --,--

Column 59, Line 24 (Claim 18, Line 20) before the word "glycidol" insert --wherein the reacted product includes--

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*